(12) United States Patent
Abbaszadeh et al.

(10) Patent No.: US 11,503,045 B2
(45) Date of Patent: Nov. 15, 2022

(54) SCALABLE HIERARCHICAL ABNORMALITY LOCALIZATION IN CYBER-PHYSICAL SYSTEMS

(71) Applicant: General Electric Company, Schenectady, NY (US)

(72) Inventors: Masoud Abbaszadeh, Clifton Park, NY (US); Walter Yund, Clifton Park, NY (US); Daniel Francis Holzhauer, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 663 days.

(21) Appl. No.: 16/261,931

(22) Filed: Jan. 30, 2019

(65) Prior Publication Data
US 2020/0244677 A1 Jul. 30, 2020

(51) Int. Cl.
*H04L 29/06* (2006.01)
*H04L 9/40* (2022.01)
*G05B 19/4155* (2006.01)
*G06N 5/02* (2006.01)

(52) U.S. Cl.
CPC ...... *H04L 63/1416* (2013.01); *G05B 19/4155* (2013.01); *G06N 5/02* (2013.01); *G05B 2219/31449* (2013.01)

(58) Field of Classification Search
CPC ... H04L 63/1416; G05B 19/4155; G06N 5/02
See application file for complete search history.

(56) References Cited

U.S. PATENT DOCUMENTS

| | | | |
|---|---|---|---|
| 10,749,890 B1 * | 8/2020 | Aloisio | G06N 5/025 |
| 2017/0193078 A1 * | 7/2017 | Limonad | G06F 21/552 |
| 2018/0191758 A1 * | 7/2018 | Abbaszadeh | H04L 63/1441 |

* cited by examiner

*Primary Examiner* — Jeffrey C Pwu
*Assistant Examiner* — Thong P Truong
(74) *Attorney, Agent, or Firm* — Buckley, Maschoff & Talwalkar LLC

(57) ABSTRACT

A cyber-physical system may have monitoring nodes that generate a series of current monitoring node values over time that represent current operation of the system. A hierarchical abnormality localization computer platform accesses a multi-level hierarchy of elements, and elements in a first level of the hierarchy are associated with elements in at least one lower level of the hierarchy and at least some elements may be associated with monitoring nodes. The computer platform may then determine, based on feature vectors and a decision boundary, an abnormality status for a first element in the highest level of the hierarchy. If the abnormality status indicates an abnormality, the computer platform may determine an abnormality status for elements, associated with the first element, in at least one level of the hierarchy lower than the level of the first element. These determinations may be repeated until an abnormality is localized to a monitoring node.

24 Claims, 27 Drawing Sheets

HRSG SUBSYSTEM RESULTS

| SUBSYSTEM | NUMBER OF NODES | TPR | FPR |
|---|---|---|---|
| HP DRUM | 59 | 100.00% | 1% |
| IP DRUM | 86 | 100.00% | 1% |
| LP DRUM | 32 | 100.00% | 1% |
| HP STEAM BYPASS | 35 | 100.00% | 1% |
| IP STEAM BYPASS | 11 | 87.46% | 1% |
| LP STEAM BYPASS | 8 | 100.00% | 1% |
| FEEDWATER SYSTEM | 40 | 100.00% | 1% |

| HP DRUM | | PREDICTED | |
|---|---|---|---|
| | | NORMAL | ATTACK |
| TRUE | NORMAL | 3301 | 40 |
| | ATTACK | 0 | 590 |

| IP DRUM | | PREDICTED | |
|---|---|---|---|
| | | NORMAL | ATTACK |
| TRUE | NORMAL | 3226 | 115 |
| | ATTACK | 0 | 590 |

| LP DRUM | | PREDICTED | |
|---|---|---|---|
| | | NORMAL | ATTACK |
| TRUE | NORMAL | 3341 | 0 |
| | ATTACK | 0 | 590 |

| HP BYPASS | | PREDICTED | |
|---|---|---|---|
| | | NORMAL | ATTACK |
| TRUE | NORMAL | 3243 | 98 |
| | ATTACK | 0 | 100.00% |

| IP BYPASS | | PREDICTED | |
|---|---|---|---|
| | | NORMAL | ATTACK |
| TRUE | NORMAL | 3028 | 313 |
| | ATTACK | 0 | 590 |

| LP BYPASS | | PREDICTED | |
|---|---|---|---|
| | | NORMAL | ATTACK |
| TRUE | NORMAL | 3334 | 7 |
| | ATTACK | 0 | 590 |

| FEEDWATER | | PREDICTED | |
|---|---|---|---|
| | | NORMAL | ATTACK |
| TRUE | NORMAL | 3316 | 25 |
| | ATTACK | 0 | 590 |

| GLOBAL | | PREDICTED | |
|---|---|---|---|
| | | NORMAL | ATTACK |
| TRUE | NORMAL | 3247 | 94 |
| | ATTACK | 0 | 590 |

| GRID | PREDICTED | |
|------|-----------|---|
| | NORMAL | ATTACK |
| TRUE NORMAL | 17641 | 39 |
| TRUE ATTACK | 1 | 5529 |

| EXCITER/BREAKER | PREDICTED | |
|------|-----------|---|
| | NORMAL | ATTACK |
| TRUE NORMAL | 1760 | 0 |
| TRUE ATTACK | 14 | 2446 |

| FREQUENCY | PREDICTED | |
|------|-----------|---|
| | NORMAL | ATTACK |
| TRUE NORMAL | 17679 | 1 |
| TRUE ATTACK | 40 | 1080 |

*FIG. 27*

SCALABLE HIERARCHICAL ABNORMALITY LOCALIZATION IN CYBER-PHYSICAL SYSTEMS

This invention was made with Government support under contract number DE-OE0000833 awarded by the Department of Energy. The Government has certain right in this invention.

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.) that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or even catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to determine when a monitoring node is experiencing a fault (as opposed to a malicious attack) and, in some cases, exactly what type of fault is occurring and where it is located. Existing approaches to protect an industrial control system, such as failure and diagnostics technologies, may not adequately address these problems—especially when a substantial number of monitoring nodes need to be analyzed.

In addition, many current attack detection technologies are passive and rely solely on monitoring data collected from the cyber-physical system. These types of protection schemes may fail in the face of a mass spoofing attack and/or a replay attack. It would therefore be desirable to protect a cyber-physical system from cyber-attacks and other abnormal operation in an automatic and accurate manner even when attacks percolate through the IT and OT layers and directly harm control systems.

SUMMARY

According to some embodiments, a cyber-physical system may have monitoring nodes that generate a series of current monitoring node values over time that represent current operation of the system. A hierarchical abnormality localization computer platform accesses a multi-level hierarchy of elements, and elements in a first level of the hierarchy are associated with elements in at least one lower level of the hierarchy and at least some elements may be associated with monitoring nodes. The computer platform may then determine, based on feature vectors and a decision boundary, an abnormality status for a first element in the highest level of the hierarchy. If the abnormality status indicates an abnormality, the computer platform may determine an abnormality status for elements, associated with the first element, in at least one level of the hierarchy lower than the level of the first element. These determinations may be repeated until an abnormality is localized to a monitoring node.

Some embodiments comprise: means for accessing, by a hierarchical abnormality localization computer platform, a multi-level hierarchy of elements, wherein at least some elements in a first level of the hierarchy are associated with a plurality of elements in at least one lower level of the hierarchy and at least some elements are associated with monitoring nodes; means for determining, by the hierarchical abnormality localization computer platform based on feature vectors and a decision boundary, an abnormality status for a first element in the highest level of the hierarchy; if the abnormality status indicates an abnormality, means for determining, by the hierarchical abnormality localization computer platform, an abnormality status for elements, associated with the first element, in at least one level of the hierarchy lower than the level of the first element; and means for repeating said determinations, by the hierarchical abnormality localization computer platform, until an abnormality is localized to at least one monitoring node.

Some technical advantages of some embodiments disclosed herein are improved systems and methods to protect one or more cyber-physical systems from abnormalities, such as cyber-attacks, in an automatic and accurate manner.

BRIEF DESCRIPTION OF THE DRAWINGS

FIG. 24 is table providing subsystem results according to some embodiments.

FIG. 25 provides subsystem confusion matrices in accordance with some embodiments.

FIG. 27 provides results per subsystem associated with tenfold cross-validation in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A cyber-physical system, such as an Industrial Control Systems ("ICS"), might be associated with large-scale systems having many monitoring nodes. Some embodiments described herein may provide scalable and efficient solutions for abnormality (e.g., cyber-attack or fault) localization in such systems. Some embodiments are based on a hierarchical top-down approach from a global system level to subsystem and component levels. The system level detection decision may be made using a global decision boundary. The system may compute decision boundaries for each subsystem in a similar fashion. The features used to compute decision boundaries for each subsystem may be comprised of the local features for each component within the subsystem plus interacting features of two or more of such components.

Figure 1:
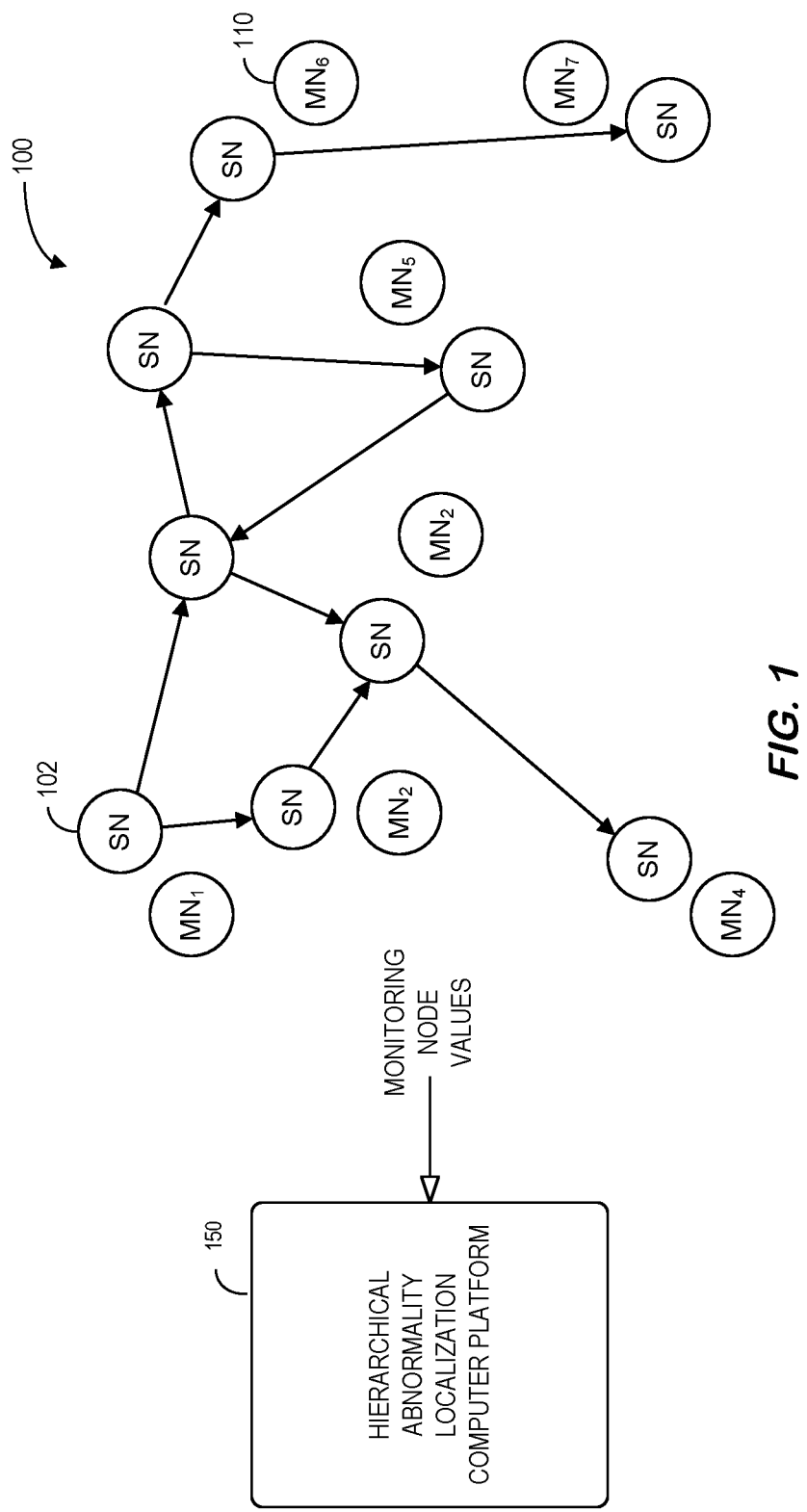
FIG. 1 is a high-level block diagram of a system that may be provided in accordance with some embodiments.

FIG. 1 is a high-level block diagram of a system 100 that may be provided in accordance with some embodiments. The system 100, such as an industrial asset associated with power generation, an electric grid, gas turbines, a data center, etc. is made up of interconnected system nodes 102 ("SN" in FIG. 1), which may be associated with sensors, actuators, data paths, sub-components of the system, etc. Some nodes 102 are associated with a monitoring node 110 that generates a series of current monitoring node values over time that represent a current operation of a cyber-physical system (e.g., a gas turbine). Note that a monitoring node 110 might be physically located such that it is not associated with any system node 102 or with multiple system nodes 102. A single system node 102 might be associated with more than one monitoring node 110. The system 100 may create global and local feature vector decision boundaries that can then be used to classify operation as "normal," "abnormal," "fault" etc. The system 100 may also include a hierarchical abnormality localization computer platform 150 that may automatically and quickly determine where an abnormality originated using a hierarchical structure of elements. As used herein, the term "automatically" may refer to a process that may be performed with little (or no) human intervention.

Figure 2:
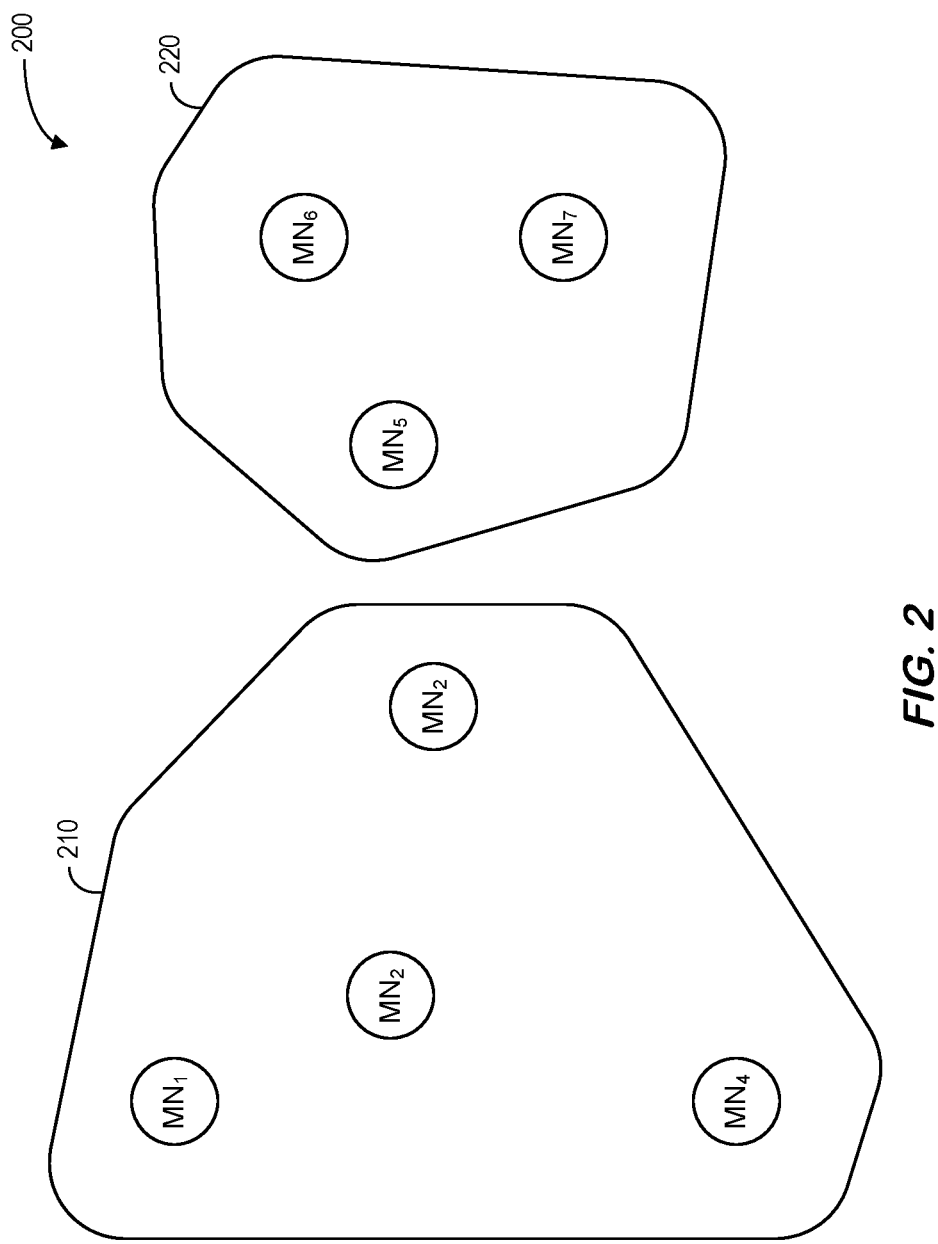
FIGS. 2 and 3 illustrate the assignment of monitoring nodes to hierarchy levels according to some embodiments.
Figure 3:
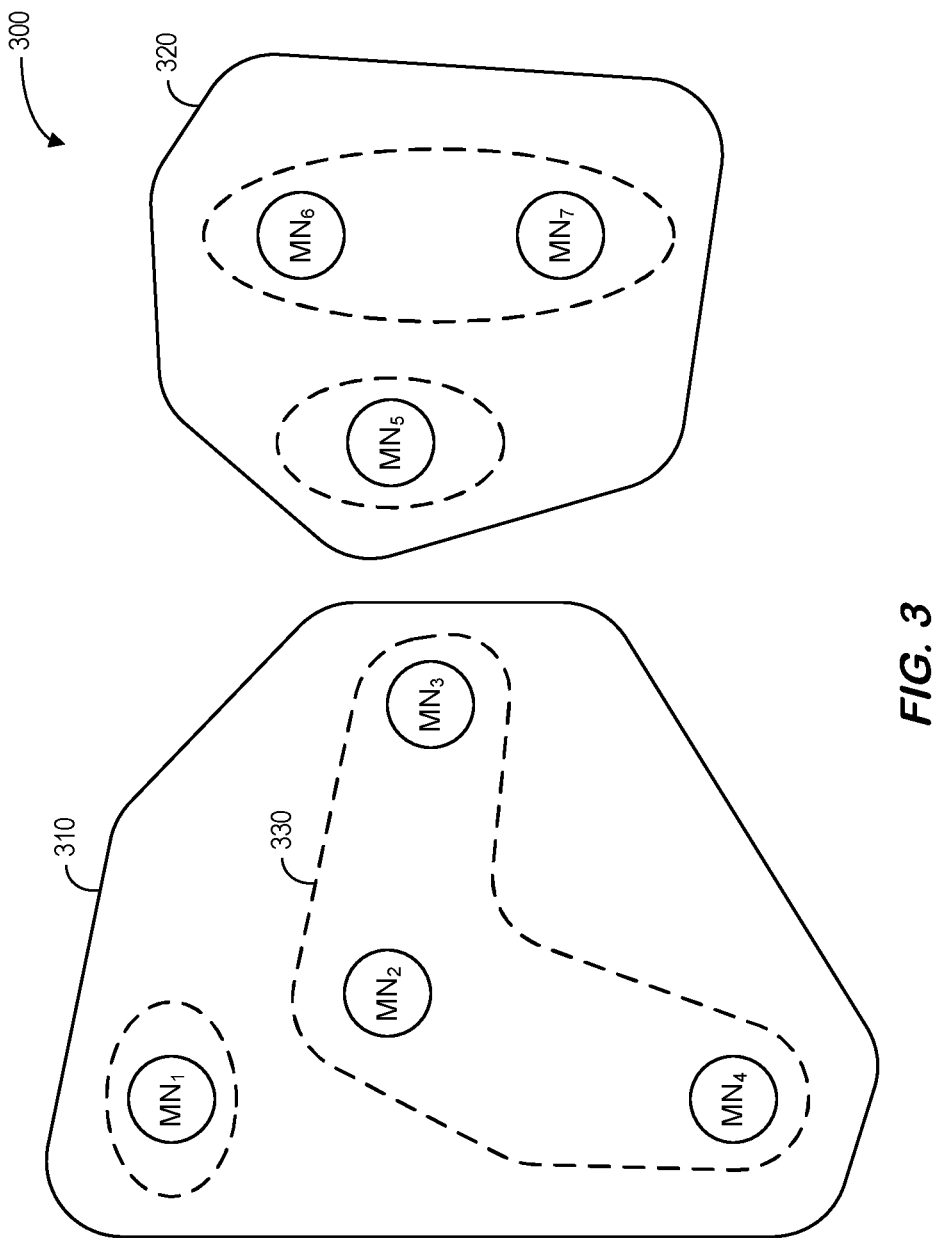
Figure 4:
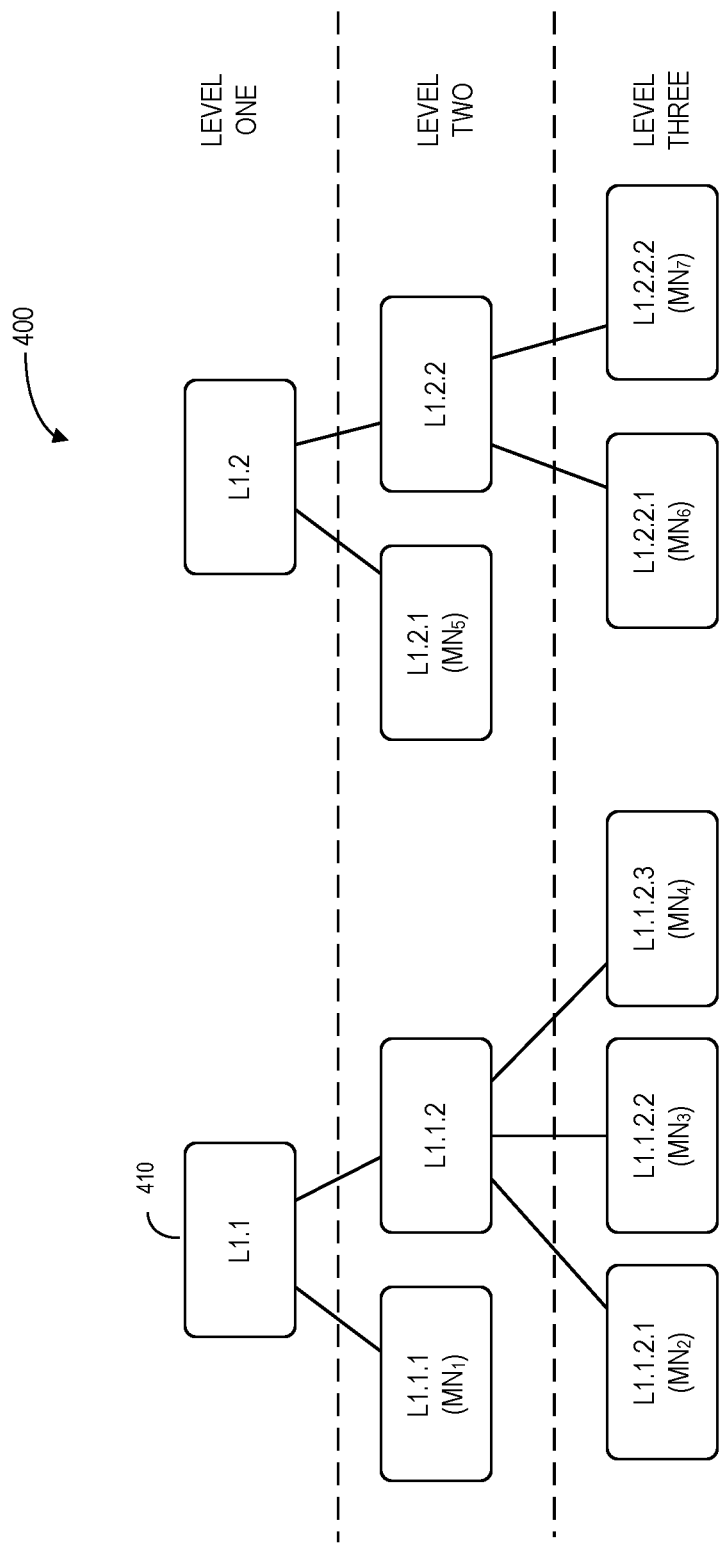
FIG. 4 illustrates a multi-level hierarchy for a cyber-physical system in accordance with some embodiments.

FIGS. 2 through 4 illustrate the assignment of monitoring nodes to hierarchy levels according to some embodiments. In particular, FIG. 2 illustrates 200 the monitoring nodes of FIG. 1 (e.g., $MN_1$ through $MN_7$) being initially divided into two elements 210, 220. The two elements might comprise a "first level" of a hierarchical structure of elements. FIG. 3 illustrates 300 these elements 310, 320 being further divided 330 in a "second level" of the hierarchical structure of elements. For example, the element 310 is divided into two sub-elements, one containing $MN_1$ and another containing $MN_2$ through $MN_4$ (as illustrated by the dashed lines in FIG. 3). FIG. 4 illustrates a multi-level hierarchy 400 for a cyber-physical system in accordance with some embodiments. The elements 410 correspond to the grouping illustrated in FIGS. 2 and 3. For example, element L1.1 (in level one), contains two elements: L1.1.1 (associated with $MN_1$) and L1.1.2 (associated with $MN_2$ through $MN_4$ in the third level). Note that an abnormality status of any element (e.g., normal, cyber-attack, fault) might only be set to "normal" when all associated elements in lower levels of hierarchy are "normal." Status another way, an abnormal status (e.g., cyber-attack or fault) in the structure will propagate up through higher levels. For example, if L1.2.2.1 ($MN_6$) is determined to be "abnormal" then both L1.2.2 and L1.2 will automatically be considered "abnormal."

Figure 5:
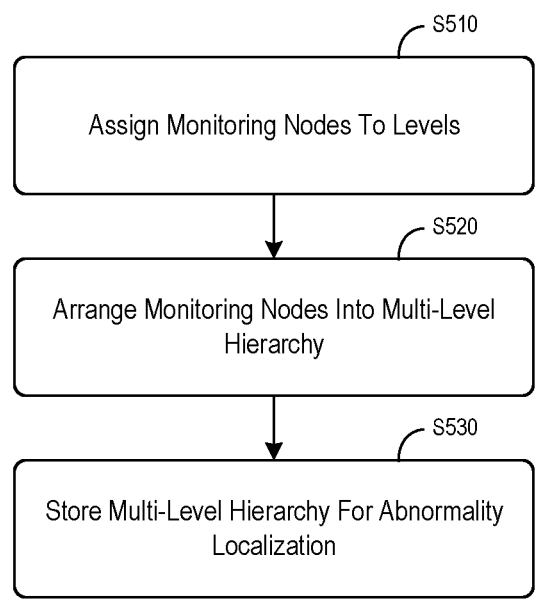
FIG. 5 is a hierarchy creation method that may be provided according to some embodiments.

FIG. 5 is a hierarchy creation method that may be provided according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S510, the system may assign monitoring nodes to various levels. In general, a first node might be assigned to a level under a second node if operation of the first node might impact operation of the second node. According to some embodiments, all nodes might be located in the lowest level of a hierarchy. At S520, system arranges monitoring nodes into a multi-level hierarchical structure (e.g., such as the one illustrated 400 in FIG. 4). At S530, the multi-level hierarchy may be stored for later use in connection with abnormality localization (e.g., as described with respect to FIG. 20).

Figure 6:
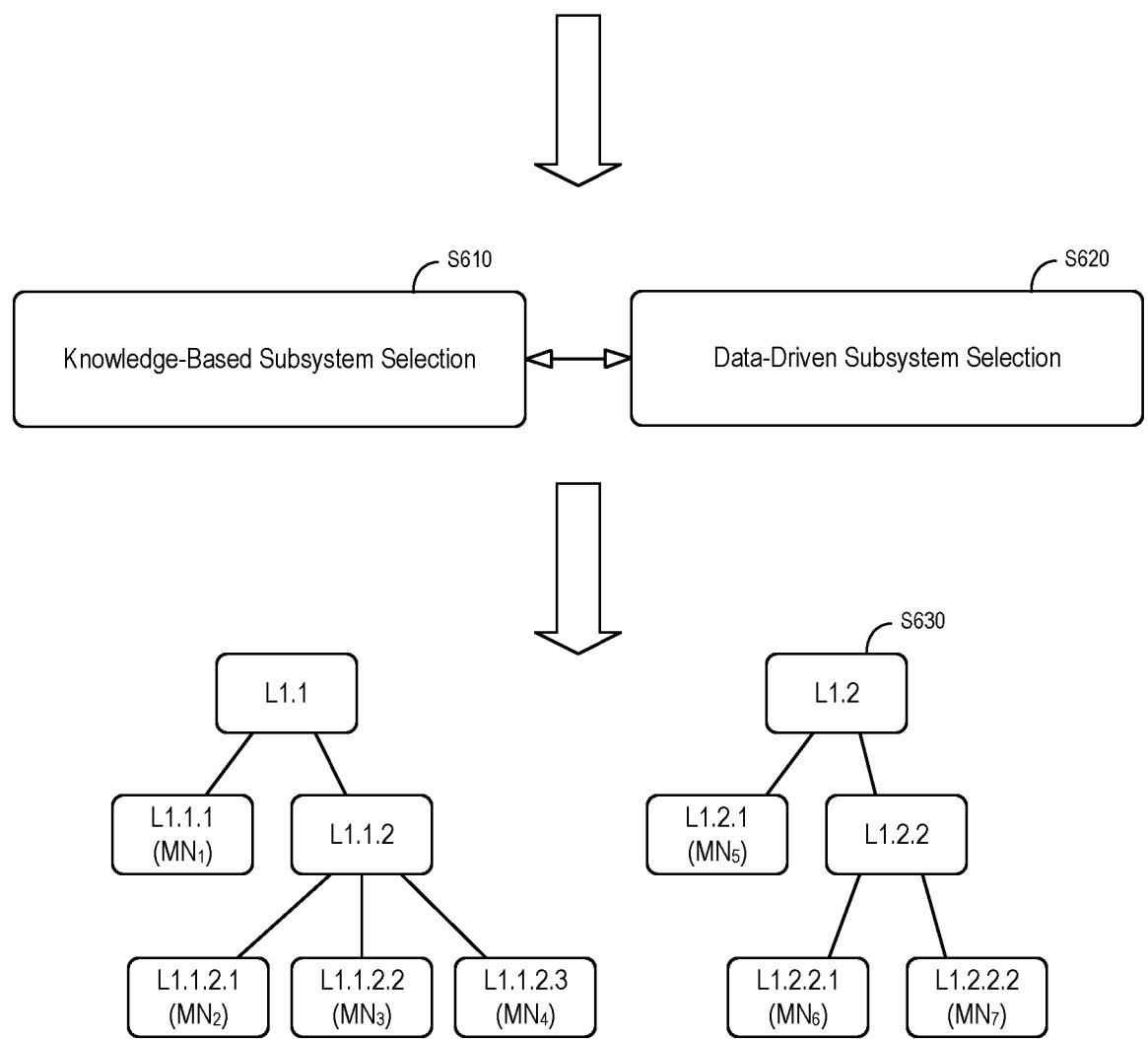
FIG. 6 is a more detailed hierarchy creation method in accordance with some embodiments.

According to some embodiments, a system may be partitioned to several subsystems and a decision boundary (separating "normal" from "abnormal" operation) may be computed is computed for each subsystem. FIG. 6 is a more detailed hierarchy creation method in accordance with some embodiments. As illustrated, the system might use a knowledge-based subsystem selection process S610 and/or a data-driven subsystem selection process S620 to create a multi-level hierarchical structure S630. With respect to the knowledge-based subsystem selection process S610, subsystems might be selected using the natural layout of an industrial asset (e.g., a plant) and a controls architecture. This could be done, for example, based on the physical location of the monitoring nodes.

With respect to the data-driven subsystem selection S620, subsystems may be selected using data clustering methods. The monitoring nodes that belong to the same cluster might form a subsystem. During the process of clustering, depending on the training dataset, data associated with a specific node might scatter among two or more clusters. To make the localization decisions, however, the system may need to allocate nodes to mutually exclusive clusters. To achieve such a result, different criteria may be used to assign each node to a particular subsystem. For example, the system might use the distance of the node data to the cluster centroids (e.g., based on Euclidian or Mahalanobis distance). Each monitoring node may have one or more time-series associated with its normal (or both normal and abnormal) behavior acquired as historical field data or generated offline for training. Various time-series clustering methods may be used to cluster nodes into appropriate subsystems. For example, a correlation heat map may be computed for all nodes. The correlation coefficient $-1 \leq r \leq 1$ might be used as a metric for distance among the nodes in a clustering algorithm. For hierarchical clustering, the distance might be defined as $d=1-|r|$, and for k-means clustering the Euclidian distance may be defined as:

$$d=\sqrt{2(1-|r|)}$$

The clustering might be performed using only normal training data, but the decision boundaries may be computed using both normal and abnormal datasets. If data associated with the nodes in a cluster (i.e., a subsystem) contain both normal and abnormal cases, supervised learning methods (such as those associated with a Support-Vector Machine ("SVM") and/or Extreme Learning Machine ("ELM") process) might be used to compute the decision boundary. Otherwise, if only normal data is available for a subsystem, semi-supervised learning methods might be used (such as one-class SVM or one-class ELM).

The system might also utilize a hybrid approach combining the two methods S610, S620 to optimize the number and boundaries of the subsystems. Note that the subsystem selection algorithm may result in the system having two or more layers of subsystems before reaching the monitoring node level. Separate classification decision boundaries may be computed for each subsystem. In the top-down hierarchical approach, each classifier might be run only when the classifier at the higher level is reporting an "abnormal" status.

Figure 7:
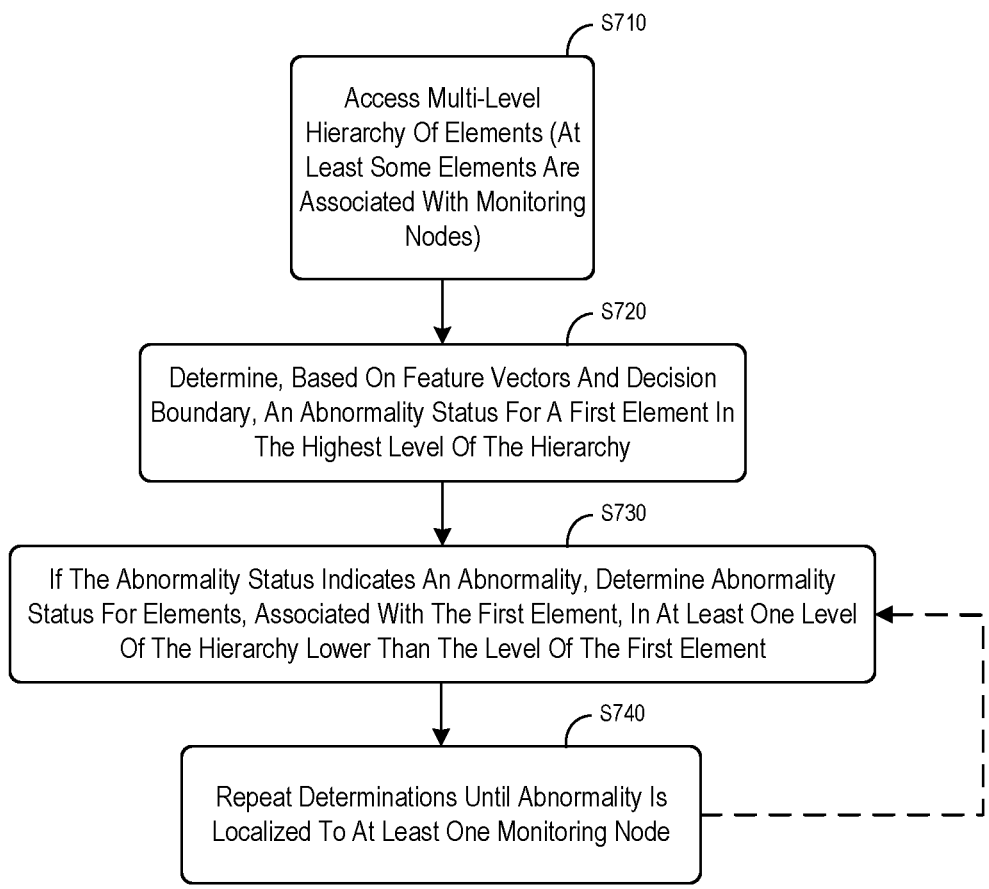
FIG. 7 is a method of using a multi-level hierarchy according to some embodiments.

FIG. 7 is a method of using a multi-level hierarchy according to some embodiments. At S710, a hierarchical abnormality localization computer platform may access a multi-level hierarchy of elements. According to some embodiments, at least some elements in a first level of the hierarchy are associated with a plurality of elements in at least one lower level of the hierarchy and at least some elements are associated with monitoring nodes. At S720, the hierarchical abnormality localization computer platform may determine, based on feature vectors and a decision boundary, an abnormality status for a first element in the highest level of the hierarchy. If the abnormality status indicates an abnormality, at S730 the hierarchical abnormality localization computer platform may determine an abnormality status for elements, associated with the first element, in at least one level of the hierarchy lower than the level of the first element. At S740, these determinations may be repeated, by the hierarchical abnormality localization computer platform (as illustrated by the dashed arrow in FIG. 7), until an abnormality is localized to at least one monitoring node.

Figure 8:
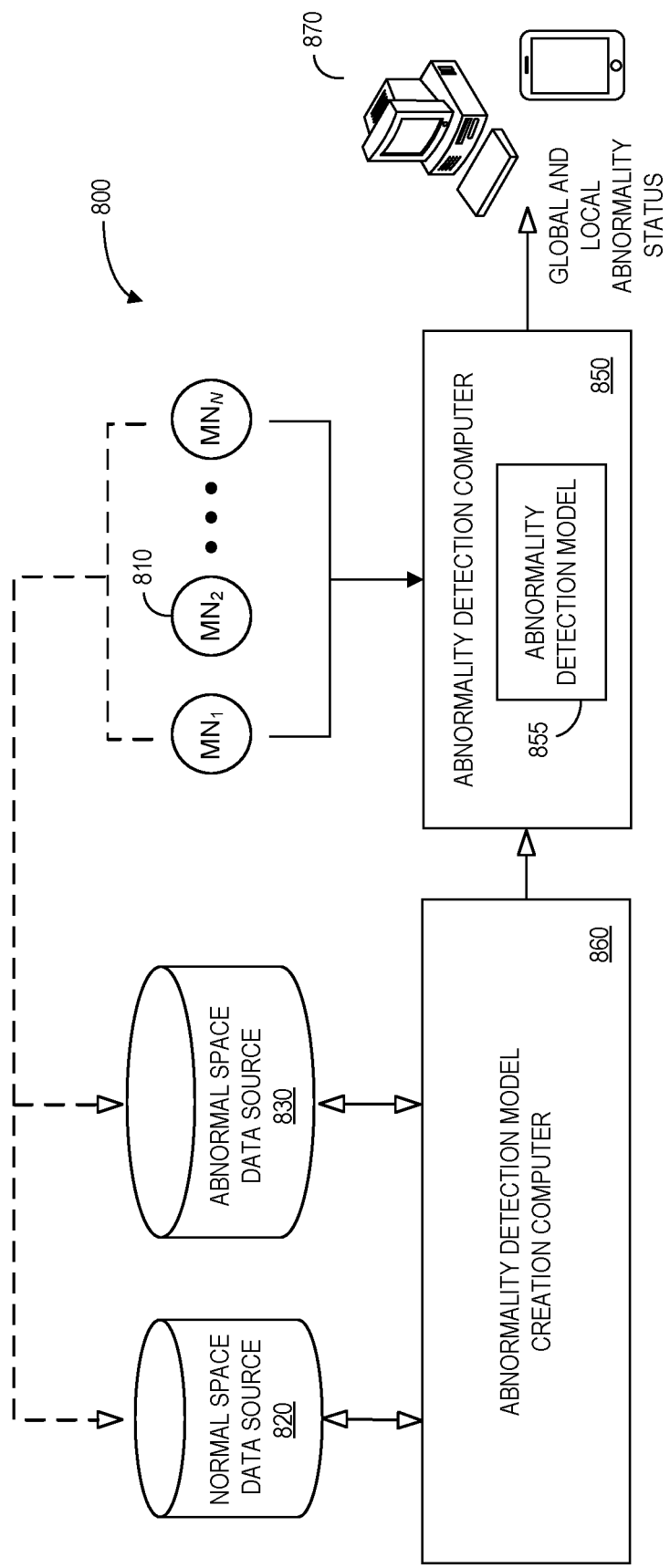
FIG. 8 is a high-level block diagram of a system that may be provided in accordance with some embodiments.

A description of how a multi-level hierarchy may be incorporated in an abnormality detection system will now be provided. FIG. 8 is a high-level architecture of a features system 800 in accordance with some embodiments. The system 800 may include monitoring node sensors 810 $MN_1$ through $MN_N$, a "normal space" data source 820, and an "abnormal space" data source 830. The normal space data source 820 might store, for each of the plurality of monitoring nodes 810, a series of normal values over time that represent normal operation of a cyber-physical system (e.g., generated by a model or collected from actual sensor data as illustrated by the dashed line in FIG. 8). The abnormal space data source 830 might store, for each of the monitoring nodes 810, a series of abnormal values that represent abnormal operation of the cyber-physical system (e.g., when the system is experiencing a cyber-attack or a fault).

Information from the normal space data source 820 and the abnormal space data source 830 may be provided to an abnormality detection model creation computer 860 that uses this data to create a decision boundary (that is, a boundary that separates normal behavior from abnormal behavior). The decision boundary may then be used by an abnormality detection computer 850 executing an abnormality detection model 855. The abnormality detection model 855 may, for example, monitor streams of data from the monitoring nodes 810 comprising data from sensor nodes, actuator nodes, and/or any other critical monitoring nodes (e.g., sensor nodes $MN_1$ through $MN_N$) and automatically output global and local abnormality status signal to one or more remote monitoring devices 870 when appropriate (e.g., for display to an operator or to have an abnormality localized using any of the embodiments described herein). According to some embodiments, information about detected threats or faults may be transmitted back to a cyber-physical system control system. Note that, according to some embodiments, the abnormality detection computer 850 may implement an approach that incorporates a hierarchical structure when localizing an abnormality.

As used herein, devices, including those associated with the system 800 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The abnormality detection model creation computer 860 may store information into and/or retrieve information from various data stores, such as the normal space data source 820 and/or the abnormal space data source 830. The various data sources may be locally stored or reside remote from the abnormality detection model creation computer 860. Although a single abnormality detection model creation computer 860 is shown in FIG. 8, any number of such devices may be included. Moreover, various devices described herein might be combined according to embodiments of the present invention. For example, in some embodiments, the abnormality detection model creation computer 860 and one or more data sources 820, 830 might comprise a single apparatus. The abnormality detection model creation computer 860 functions may be performed by a constellation of networked apparatuses, in a distributed processing or cloud-based architecture.

A user may access the system 800 via one of the monitoring devices 870 (e.g., a Personal Computer ("PC"), tablet, or smartphone) to view information about and/or manage abnormality information in accordance with any of the embodiments described herein. In some cases, an interactive graphical display interface may let a user define and/or adjust certain parameters (e.g., abnormality detection trigger levels or remediation steps) and/or provide or receive automatically generated recommendations or results from the abnormality detection model creation computer 860 and/or abnormality detection computer 850.

Thus, some embodiments described herein may use time series data from one or more monitoring nodes 810 from a cyber-physical (i.e., industrial or enterprise) asset and provide a reliable abnormality detection with low false positive rate. The system may extract features from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node might be optimized using domain-knowledge and/or a feature discovery process. The features may be, for example, calculated over a sliding window with consecutive samples of specified duration from time series data. The length of the window and the duration of overlap for each batch may be determined from domain knowledge and an inspection of the data or using batch processing. Note that features may be computed at the local level (associated with each monitoring node) and the global level (associated with all the monitoring nodes, i.e., the whole asset). The time-domain values of the nodes or their extracted features may be, according to some embodiments, normalized for better numerical conditioning.

Figure 9:
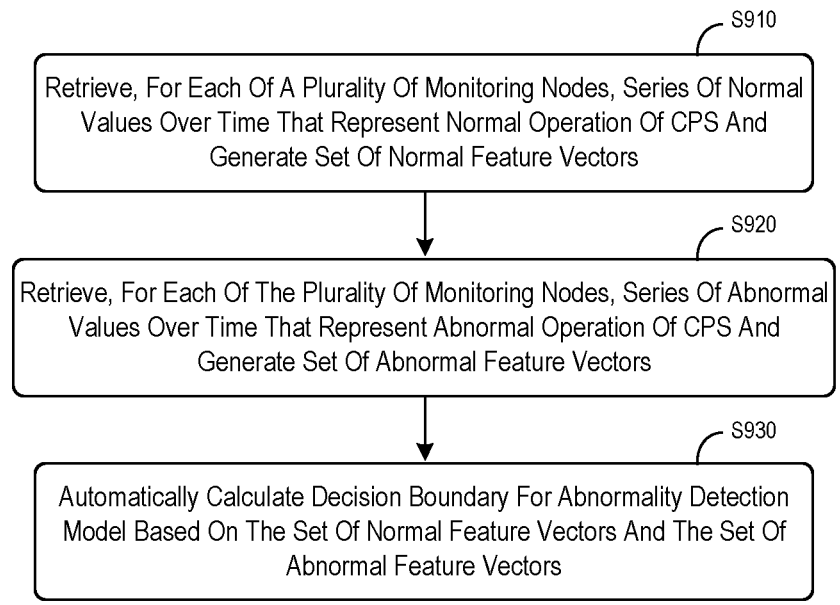
FIG. 9 is a model creation method according to some embodiments.

FIG. 9 illustrates a model creation method that might be performed by some or all of the elements of the system 800 described with respect to FIG. 8. At S910, the system may retrieve, for each of a plurality of monitoring nodes (e.g., sensor nodes, ac, controller nodes, etc.), a series of normal values over time that represent normal operation of the Cyber-Physical System ("CPS") and a set of normal feature vectors may be generated. Similarly, at S920 the system may retrieve, for each of the plurality of monitoring nodes, a series of abnormal (e.g., attacked or fault) values over time that represent an abnormal operation of the cyber-physical system, and a set of abnormal feature vectors may be generated. The series of normal and/or abnormal values might be obtained, for example, by running Design of Experiments ("DoE") on a cyber-physical system. At S930, a decision boundary may be automatically calculated for an abnormality detection model based on the set of normal feature vectors and the set of abnormal feature vectors.

According to some embodiments, the decision boundary might be associated with a line, a hyperplane, a non-linear boundary separating normal space from threatened space, and/or a plurality of decision boundaries. Moreover, a decision boundary might comprise a multi-class decision boundary separating normal space, attacked space, and degraded operation space (e.g., when a sensor fault occurs). In addition, note that the abnormality detection model might be associated with the decision boundary, feature mapping functions, and/or feature parameters.

Figure 10:
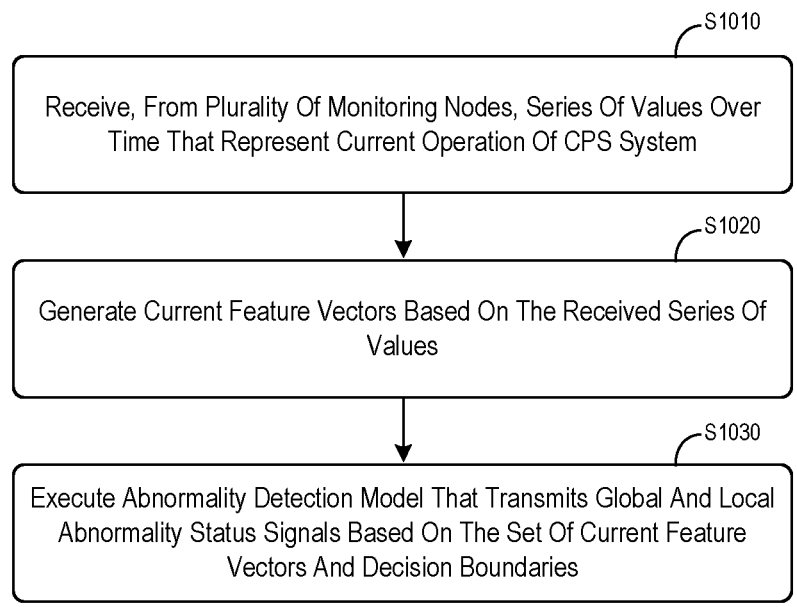
FIG. 10 is an abnormality status method according to some embodiments.

The decision boundary can then be used to detect abnormal operation (e.g., as might occur during cyber-attacks). For example, FIG. 10 is an abnormality status method according to some embodiments. At S1010, the system may receive, from a plurality of monitoring nodes, a series of current values over time that represent a current operation of the cyber-physical system. At S1020, an attack detection platform computer may then generate current feature vectors based on the received series of current values. At S1030, an abnormality detection model may be executed to transmit an abnormal status signal based on the set of current feature vectors and a decision boundary when appropriate (e.g., when a cyber-attack or fault is detected). According to some embodiments, one or more response actions may be performed when an abnormality status signal is transmitted. For example, the system might automatically shut down all or a portion of the cyber-physical system (e.g., to let the detected potential cyber-attack be further investigated). As other examples, one or more parameters might be automatically modified, a software application might be automatically triggered to capture data and/or isolate possible causes, etc.

Some embodiments described herein may take advantage of the physics of a control system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitored in substantially real-time. Abnormalities may be detected by classifying the monitored data as being "normal" or disrupted (or degraded). This decision boundary may be constructed using dynamic models and may help enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high-fidelity models), defined boundary margins may help to create an abnormal zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account on operator's knowledge about system operation (e.g., the differences between normal and abnormal operation).

Figure 11:
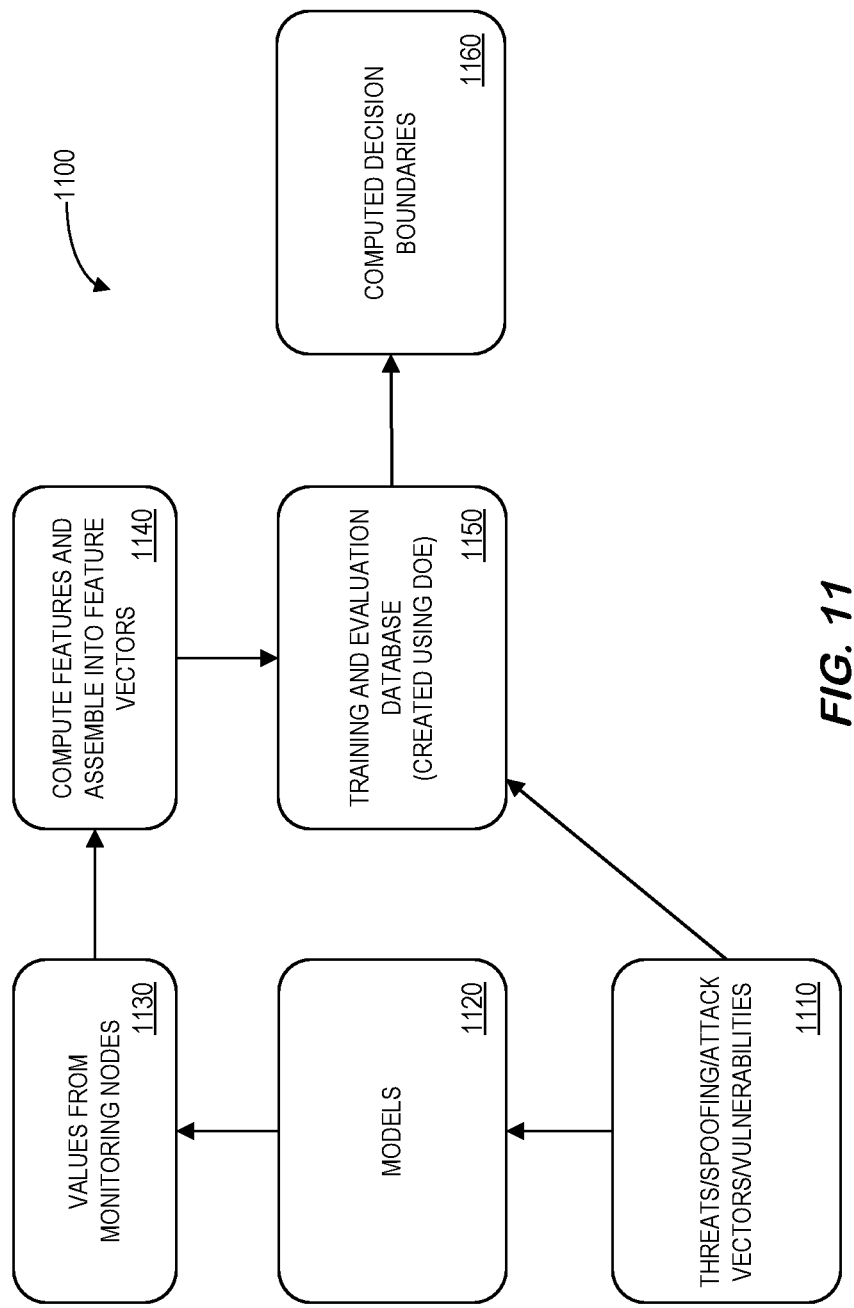
FIG. 11 illustrates an off-line process in accordance with some embodiments.

FIG. 11 illustrates an off-line boundary creation process 1100 in accordance with some embodiments. Information about threats, spoofing, attack vectors, vulnerabilities, etc. 1110 may be provided to models 1120 and/or a training and evaluation database 1150 created using DoE techniques. The models 1120 may, for example, simulate data 1130 from monitoring nodes to be used to compute features that are assembled into a feature vector 1140 to be stored in the training and evaluation database 1150. The data in the training and evaluation database 1150 may then be used to compute decision boundaries 1160 to distinguish between normal operation and abnormal operation. According to some embodiments, the process 1100 may include a prioritization of monitoring nodes and anticipated attack vectors to form one or more data sets to develop decision boundaries. Attack vectors are abnormal values at critical inputs where malicious attacks can be created at the domain level that will make the system go into threatened/abnormal space. In addition, the models 1120 may comprise high-fidelity models that can be used to create a data set (e.g., a set that describes threat space as "levels of threat conditions in the system versus quantities from the monitoring nodes"). The data 1130 from the monitoring nodes might be, for example, quantities that are captured for a length of from 60 to 80 seconds from sensor nodes, actuator nodes, and/or controller nodes (and a similar data set may be obtained for "levels of normal operating conditions in the system versus quantities from the monitoring nodes"). This process will result in data sets for "abnormal space" and "normal space." The 60 to 80 seconds long quantities may be used to compute features 1140 using feature engineering to create feature vectors. These feature vectors can then be used to obtain a decision boundary that separates the data sets for abnormal space and normal space for various elements in a hierarchical structure (used to detect an anomaly such as a cyber-attack or naturally occurring fault).

Since attacks might be multi-prong (e.g., multiple attacks might happen at once), DoE experiments may be designed to capture the attack space (e.g., using full factorial, Taguchi screening, central composite, and/or Box-Behnken). When models are not available, these DoE methods can also be used to collect data from real-world asset control system. Experiments may run, for example, using different combinations of simultaneous attacks. Similar experiments may be run to create a data set for the normal operating space. According to some embodiments, the system may detect "degraded" or faulty operation as opposed to a threat or attack. Such decisions may require the use of a data set for a degraded and/or faulty operating space.

Figure 12:
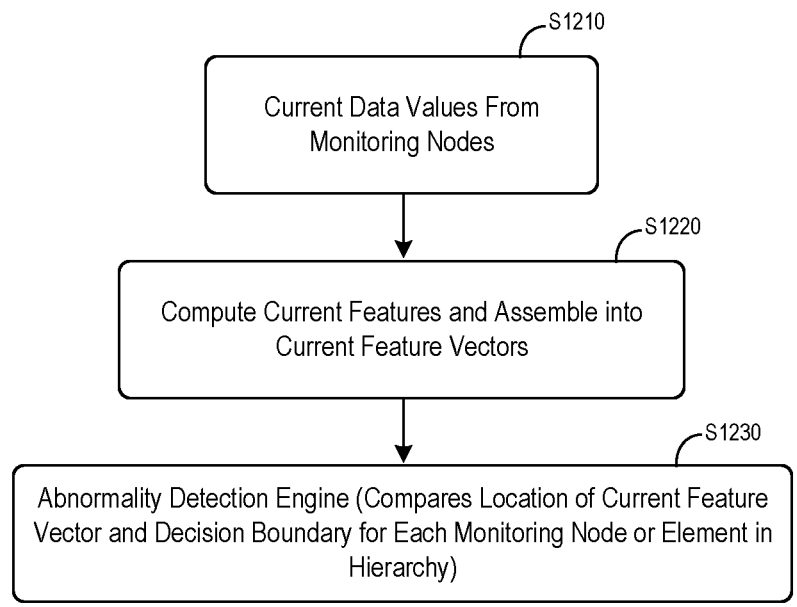
FIG. 12 illustrates a real-time process according to some embodiments.

FIG. 12 illustrates a real-time process to protect a cyber-physical system according to some embodiments. At S1210, current data from monitoring nodes may be gathered (e.g., in batches of from 60 to 80 seconds). At S1220, the system may compute features and form feature vectors. For example, the system might use weights from a principal component analysis as features. At S1230, an abnormality detection engine may compare location of feature vectors to a decision boundary to make a determination (and output an abnormal signal if necessary). According to some embodiments, monitoring node data from models (or from real systems) may be expressed in terms of features since features are a high-level representation of domain knowledge and can be intuitively explained. Moreover, embodiments may handle multiple features represented as vectors and interactions between multiple sensed quantities might be expressed in terms of "interaction features."

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Figure 13:
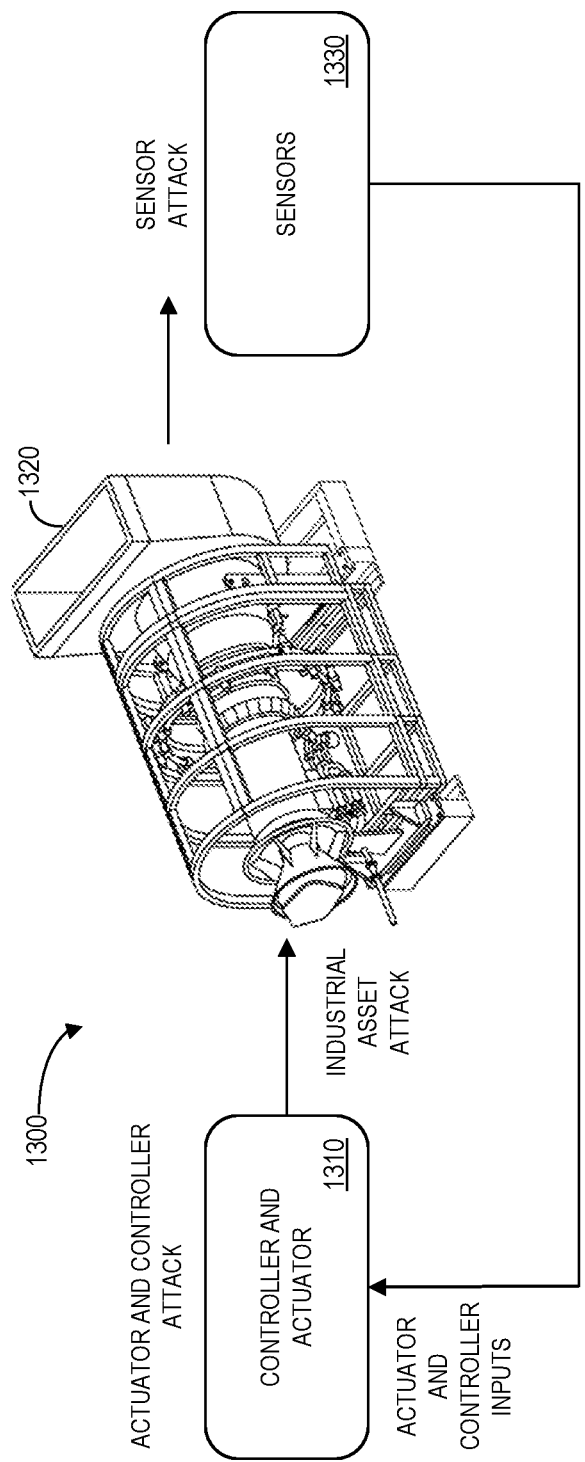
FIG. 13 is an example associated with a cyber-physical system engine in accordance with some embodiments.

FIG. 13 is an example 1300 associated with a cyber-physical system in accordance with some embodiments. In particular, the example includes a controller and actuator portion 1310 subject to actuator and controller attacks, a gas turbine portion 1320 subject to state attacks, and sensors 1330 subject to sensor attacks. By way of examples only, the sensors 1330 might comprise physical and/or virtual sensors associated with temperatures, airflows, power levels, etc. The actuators might be associated with, for example, motors. By monitoring the information in the cyber-physical system, a threat detection platform may be able to detect cyber-attacks (e.g., using feature vectors and a decision boundary) that could potentially cause a large amount of damage.

Figure 14:
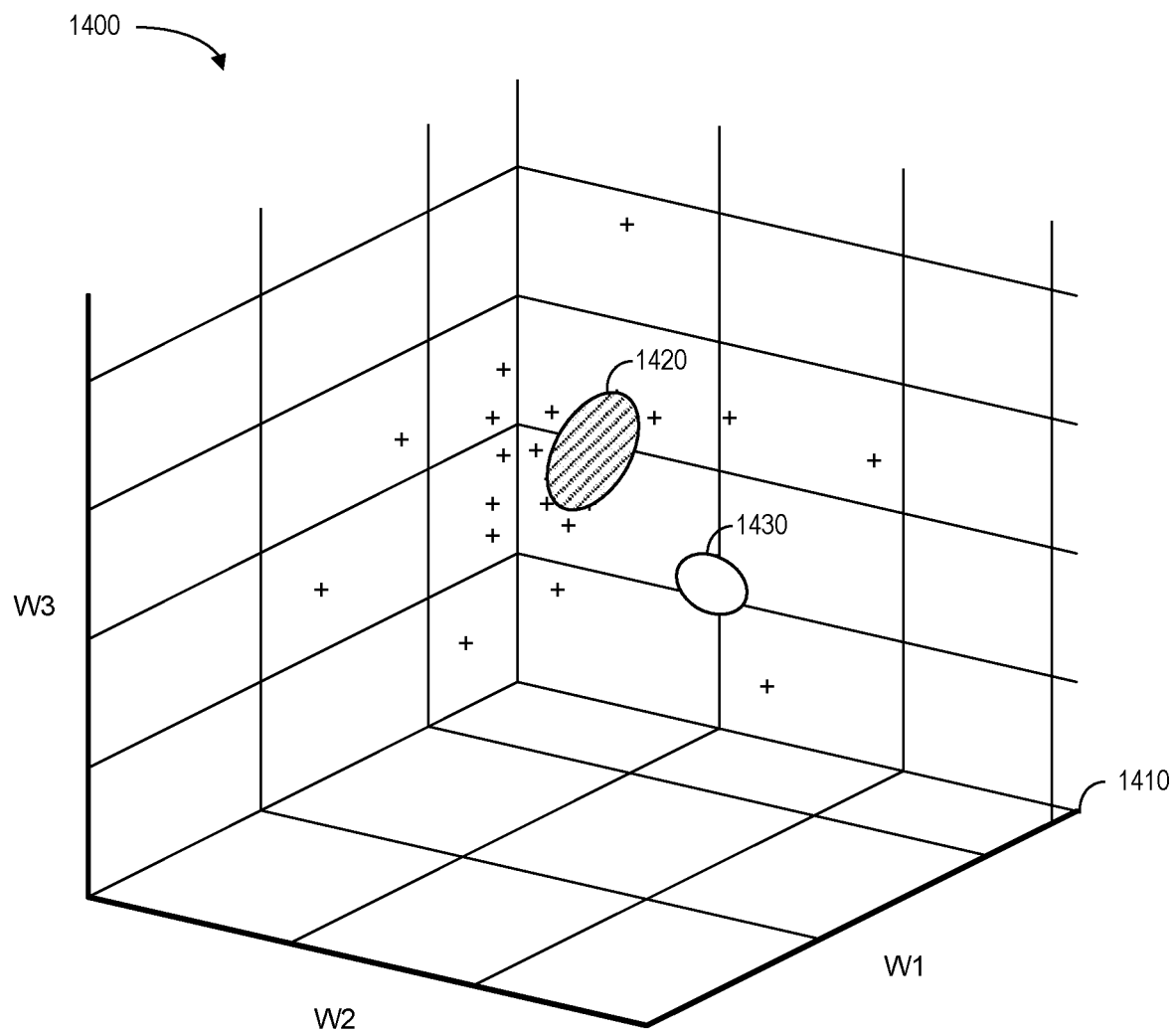
FIG. 14 illustrates three dimensions of sensor outputs in accordance with some embodiments.

FIG. 14 illustrates 1400 three dimensions of monitoring node outputs in accordance with some embodiments. In particular, a graph 1410 plots monitoring node outputs ("+") in three dimensions, such as dimensions associated with Principal Component Features ("PCF"): w1, w2, and w3. Moreover, the graph 1410 includes an indication of a normal operating space decision boundary 1420 that might be appropriate when no watermarking signals are being injected into the system. Although a single contiguous boundary 920 is illustrated in FIG. 14, embodiments might be associated with multiple regions. The graph 1410 further includes a normal operating space decision boundary 1430 that might be appropriate when watermarking signals are being injected into the system. Note that PCF information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a monitoring node quantity at "k" instant of time. Moreover, output may then be expressed as a weighted linear combination of basis functions as follows:

$$S = S_0 + \sum_{j=1}^{N} w_j \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, weight may be found using the following equation (assuming that the basis sets are orthogonal):

$$w_j = (S - S_0)^T \Psi_j$$

Note that weights may be an example of features used in a feature vector.

Thus, embodiments may enable the passive detection of indications of multi-class abnormal operations using real-time signals from monitoring nodes. Moreover, the detection framework may allow for the development of tools that facilitate proliferation of the invention to various systems (e.g., turbines) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to cyber-physical system operators so that an attack may be thwarted (or the effects of the attack may be blunted), reducing damage to equipment.

According to some embodiments, a system may further localize an origin of a threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in an abnormality status signal.

Some embodiments of the algorithm may utilize feature-based learning techniques based on high-fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on control signals, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

Figure 15:
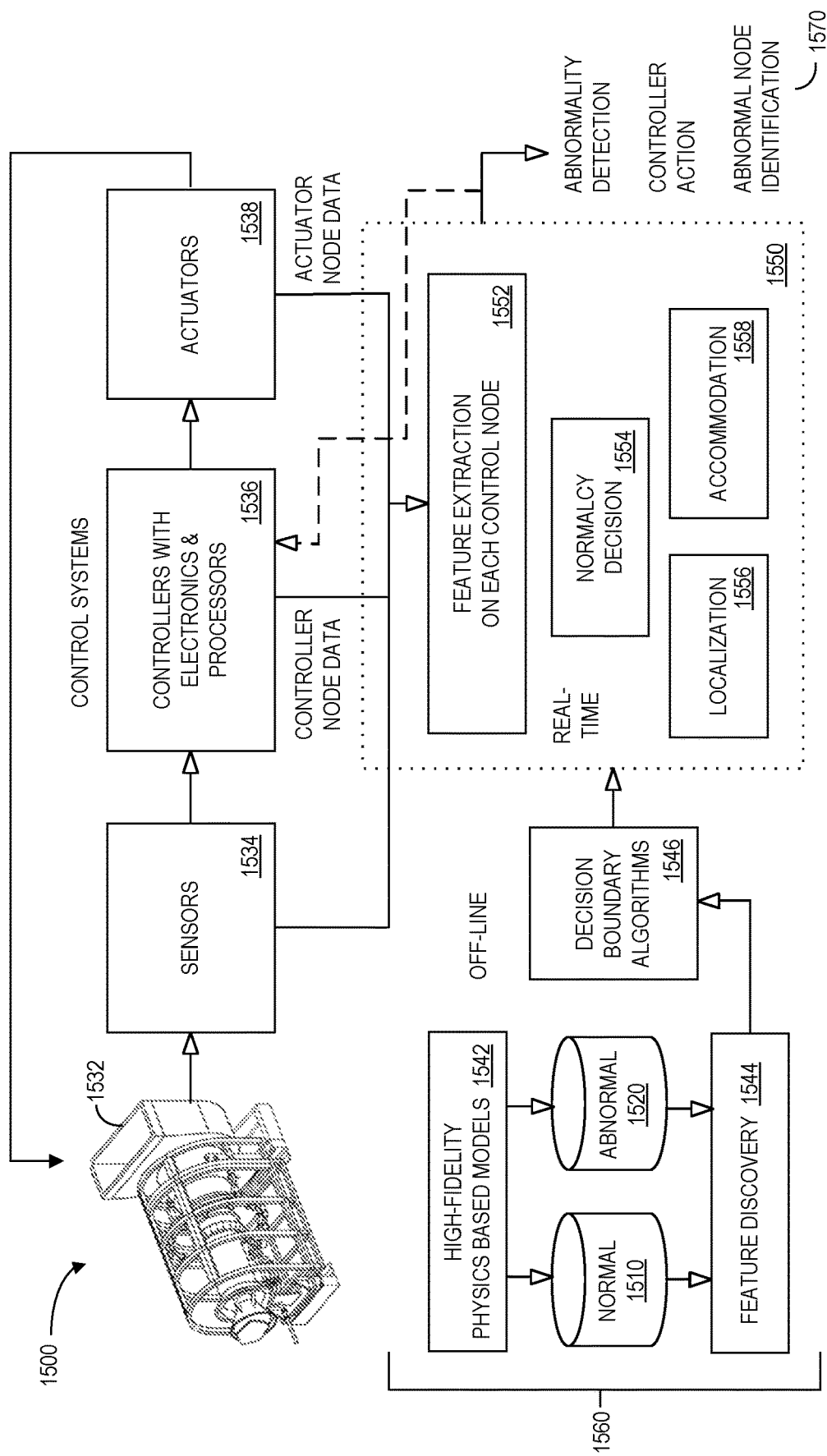
FIG. 15 is an abnormality status system according to some embodiments.

A cyber-attack detection and localization algorithm may process a real-time cyber-physical system signal data stream and then compute features (multiple identifiers) which can then be compared to the signal-specific decision boundary. A block diagram of a system 1500 utilizing a signal-specific cyber-physical system abnormality detection and localization algorithm according to some embodiments is provided in FIG. 15. In particular, a gas turbine 1532 provides information to sensors 1534 which helps controllers with electronics and processors 1536 adjust actuators 1538. An abnormality detection system 1560 may include one or more high-fidelity physics-based models 1542 associated with the turbine 1532 to create normal data 1510 and/or abnormal data 1520. The normal data 1510 and abnormal data 1520 may be accessed by a feature discovery component 1544 and processed by decision boundary algorithms 1546 while off-line (e.g., not necessarily while the gas turbine 1532 is operating). The decision boundary algorithms 1546 may generate an abnormal model including decision boundaries for various monitoring nodes. Each decision boundary may separate two data sets in a high dimensional space which is constructed by running a binary classification algorithm, such as a support vector machine using the normal data 1510 and abnormal data 1520 for each monitoring node signal (e.g., from the sensors 1534, controllers 1536, and/or the actuators 1538).

A real-time abnormality detection platform 1550 may receive the boundaries along with streams of data from the monitoring nodes. The platform 1550 may include a feature extraction on each monitoring node element 1552 and a normalcy decision 1554 with an algorithm to detect attacks in individual signals using signal specific decision boundaries, as well rationalize attacks on multiple signals, to declare which signals were attacked (or are otherwise abnormal), and which became anomalous due to a previous attack on the system via a localization module 1556. An accommodation element 1558 may generate outputs 1570, such as an abnormality status signal, a controller action, and/or a list of abnormal monitoring nodes.

During real-time detection, contiguous batches of control signal data may be processed by the platform 1550, normalized and the feature vector extracted. The location of the vector for each signal in high-dimensional feature space may then be compared to a corresponding decision boundary. If it falls within the abnormal region, then a cyber-attack or fault may be declared. The algorithm may then make a decision about where the attack originally occurred using a hierarchical structure. An attack may sometimes be on the actuators 1538 and then manifested in the sensor 1534 data. Attack assessments might be performed in a post decision module (e.g., the localization element 1556) to isolate whether the attack is related to the sensor, controller, or actuator (e.g., indicating which part of the monitoring node). This may be done by individually monitoring, overtime, the location of the feature vector with respect to the hard decision boundary. For example, when a sensor 1534 is spoofed, the attacked sensor feature vector will cross the hard decision boundary earlier than the rest of the vectors as described with respect to FIGS. 16 through 18. If a sensor 1534 is declared to be anomalous, and a command to the auxiliary equipment is later determined to be anomalous, it may be determined that the original attack, such as signal spoofing, occurred on the sensor 1534. Conversely, if the signal to the auxiliary equipment was determined to be anomalous first, and then later manifested in the sensor 1534 feedback signal, it may be determined that the signal to the equipment was initially attacked.

According to some embodiments, it may be detected whether or not a signal is in the normal operating space (or abnormal space) through the use of localized decision boundaries and real-time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 16:
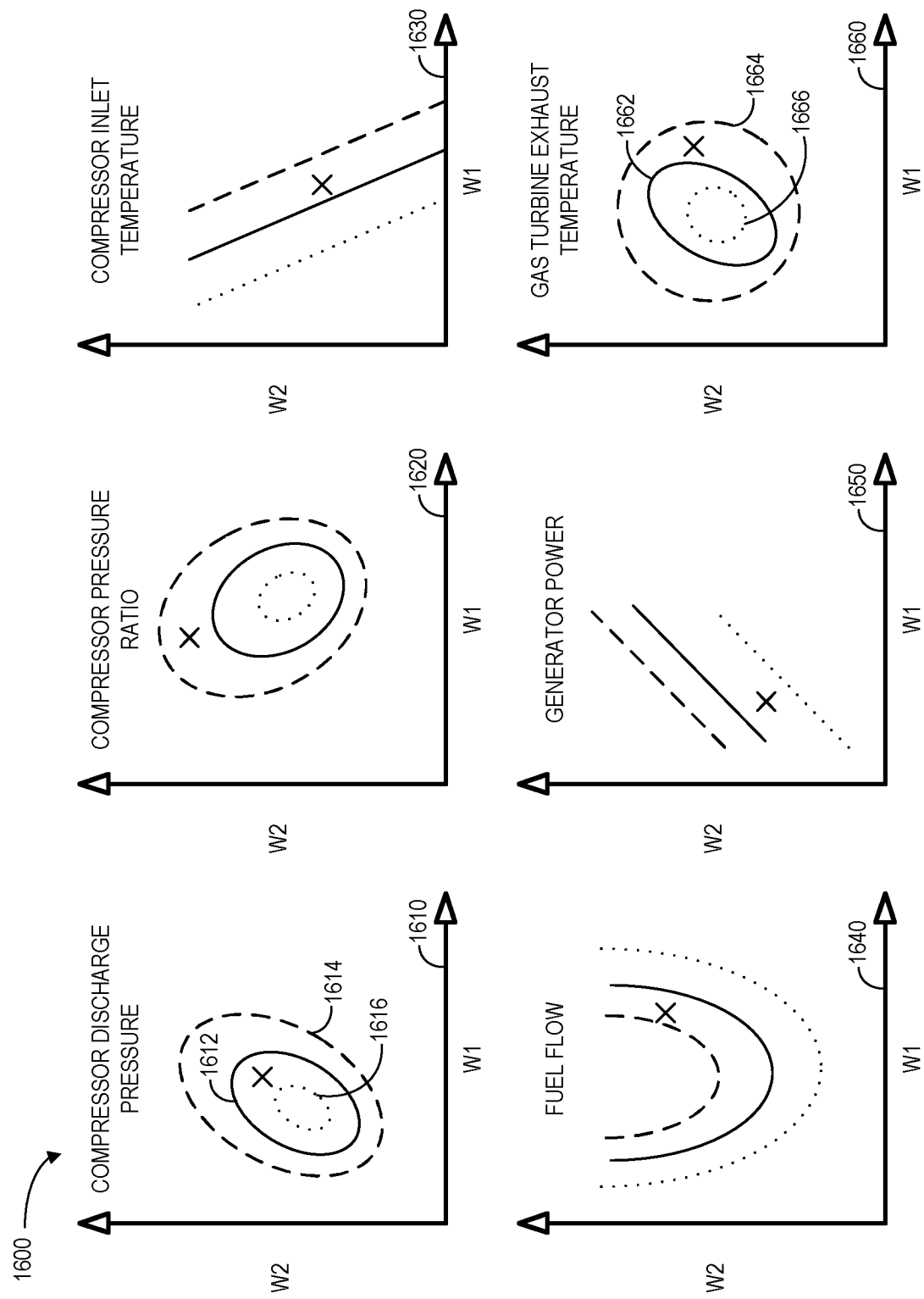
FIGS. 16 through 18 illustrate boundaries and locations of feature vectors for various parameters in accordance with some embodiments.

FIG. 16 illustrates 1600 boundaries and feature vectors for various monitoring node parameters in accordance with some embodiments. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for five features: compressor discharge temperature 1610, compressor pressure ratio 1620, compressor inlet temperature 1630, fuel flow 1640, generator power 1650, and gas turbine exhaust temperature 1660. Each graph includes a hard boundary 1612 (solid curve), an inner boundary 1616 (dotted curve), and an outer boundary 1614 (dashed curve) and an indication associated with current feature location for each monitoring node parameter (illustrated with an "X" on the graphs). As illustrated in FIG. 16, the current monitoring node location is between the minimum and maximum boundaries (that is, the "X" is between the dotted and dashed lines). As a result, the system may determine that the operation of the cyber-physical system control system is normal (and no threat is being detected indicating that the system is currently under attack or that a naturally occurring fault has occurred).

Figure 17:
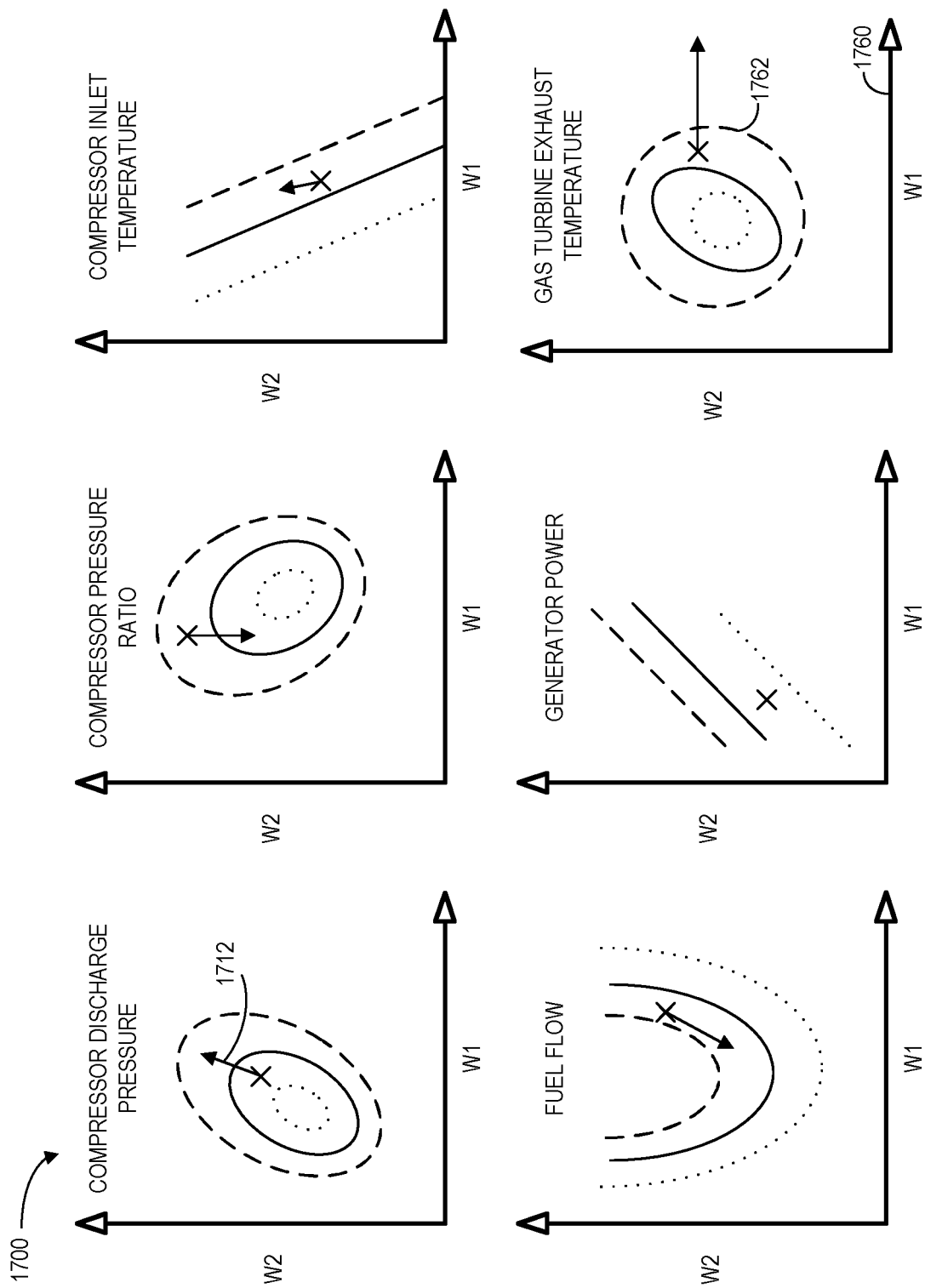

FIG. 17 illustrates 1700 subsequent boundaries and feature vectors for these parameters. Consider, for example, a feature vector movement 1712 for the compressor discharge pressure. Even though feature vector 1712 has moved, it is still within the maximum and minimum boundaries and, as a result, normal operation of that monitoring node may be determined. This is the case for the first five graphs in FIG. 17. In this example, the feature vector for gas turbine exhaust temperature 1760 has moved outside an associated threshold 1762 and, as a result, abnormal operation of a monitoring node may be determined. The algorithm detects this cyber-attack, and two parallel actions might be initiated. One action may be post processing of the signal to discover what was attacked, in this case if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 17, assume that the gas turbine exhaust temperature signal was attacked. This may cause the system to respond in such a way so as to put other signals into an abnormal state. This is illustrated 1800 in FIG. 18, where the attack has already been detected and now other signals shown to be abnormal. In particular, feature movement for the compressor discharge pressure 1812, compressor pressure ratio 1822, compressor inlet temperature 1832, and fuel flow 1842 have all become abnormal. Note that the feature vector for generator power did not become abnormal. In order to decide whether or not these signals 1812, 1822, 1832, 1842 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed.

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to Fault Detection Isolation and Accommodation ("FDIA"), which itself is very limited. The hybrid cyber-attack detection and localization algorithms described herein can not only detect abnormal signals of sensors, but can also detect signals sent to auxiliary equipment, control intermediary parameters and/or control logical(s). The algorithms may also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running DoE experiments on high-fidelity models. A data set for each sensor might comprise a feature vector for given threat values (e.g., temperature, airflow, etc.). Full factorial, Taguchi screening, central composite and Box-Behnken are some of the known design methodologies used to create the attack space. When models are not available, these DoE methods are also used to collect data from real-world cyber-physical systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 18:
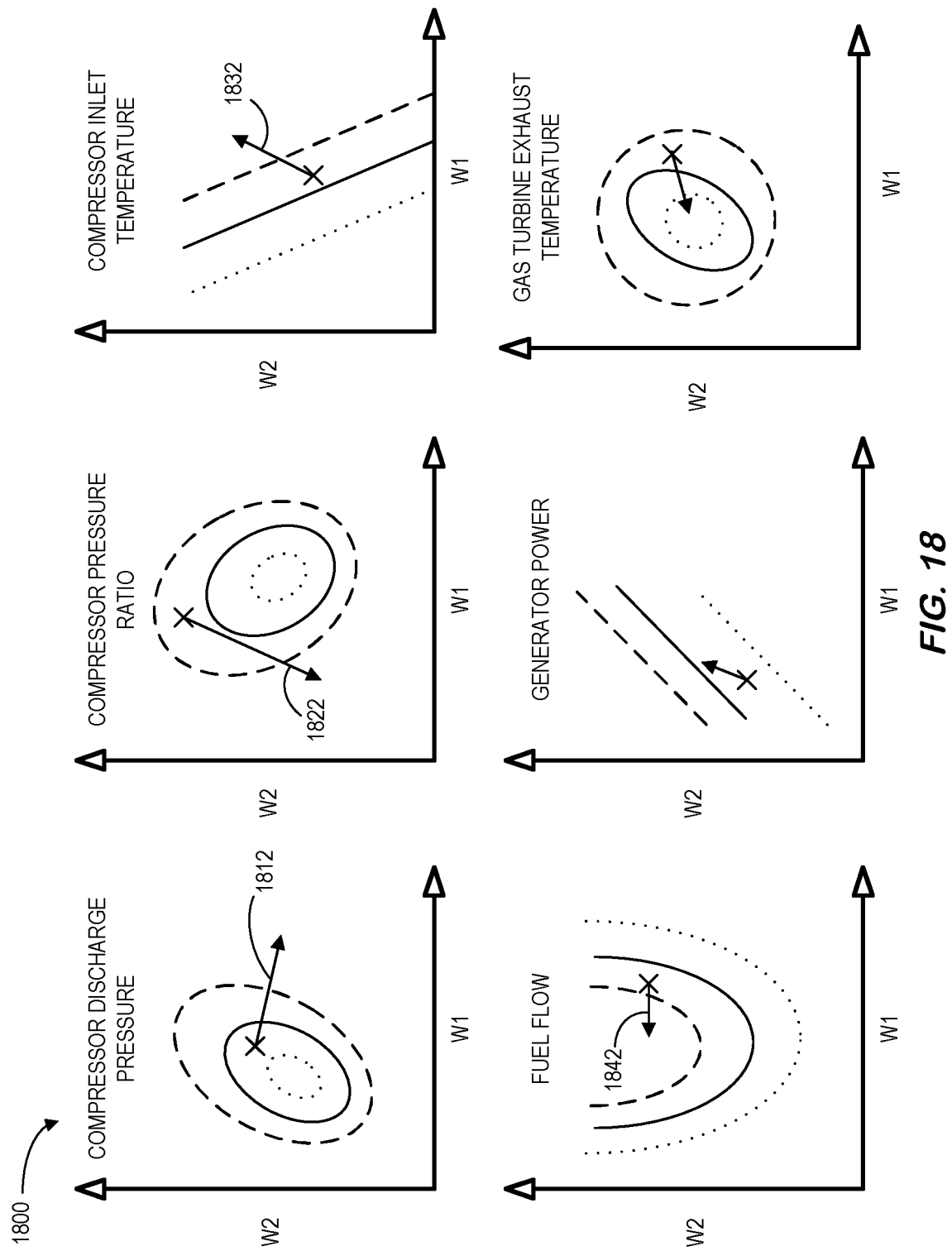

Note that multiple vector properties might be examined, and the information described with respect to FIGS. 16 through 18 may be processed to determine if the signal had been trending in a specific direction as the attack was detected (or if it had just been moving due to noise). Had the signal been uniformly trending as the attack took place and afterward, then this signal is a response to the original attack and not an independent attack.

According to some embodiments, the system may localize or otherwise analyze an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the abnormality status signal.

Some embodiments described herein may take advantage of the physics of a cyber-physical system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the cyber-physical system may be monitored in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the cyber-physical system to normal operation in a timely fashion.

Thus, some embodiments may provide an advanced anomaly detection algorithm to detect cyber-attacks on, for example, key cyber-physical system control sensors. The algorithm may identify which signals(s) are being attacked using control signal-specific decision boundaries and may inform a cyber-physical system to take accommodative actions. In particular, a detection and localization algorithm might detect whether a sensor, auxiliary equipment input signal, control intermediary parameter, or control logical are in a normal or anomalous state. Some examples of cyber-physical system monitoring nodes that might be analyzed include: critical control sensors; control system intermediary parameters; auxiliary equipment input signals; and/or logical commands to controller.

A cyber-attack detection and localization algorithm may process a real-time cyber-physical system signal data stream and then compute features (multiple identifiers) which can then be compared to the sensor specific decision boundary. In some embodiments, generating features may involve simply performing an identity transform. That is, the original signal might be used as it is.

Figure 19:
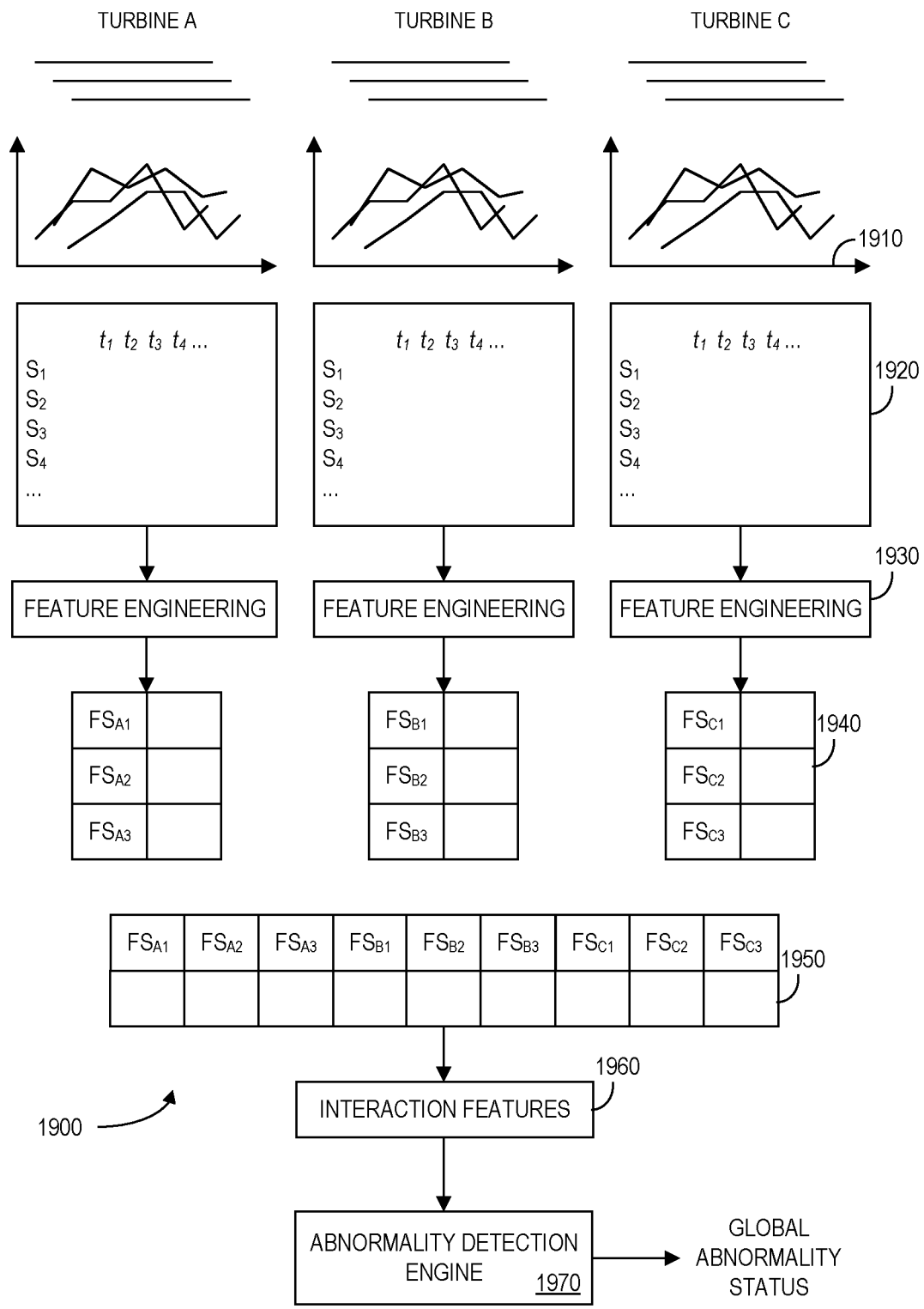
FIG. 19 is an example of a global abnormality protection system in accordance with some embodiments when multiple gas turbines are involved in a system.

Feature vectors may be generated on a monitoring-node-by-monitoring node basis and may be considered "local" to each particular monitoring node. FIG. 19 is an example of a "global" abnormality protection system 1900 in accordance with some embodiments when multiple gas turbines are involved in a system. In particular, the system 1900 includes three turbines (A, B, and C) and batches of values 1910 from monitoring nodes are collected for each generated over a period of time (e.g., 60 to 80 seconds). According to some embodiments, the batches of values 1910 from monitoring nodes overlap in time. The values 1910 from monitoring nodes may, for example, be stored in a matrix 1920 arranged by time ($t_1$, $t_2$, etc.) and by type of monitoring node ($S_1$, $S_5$, etc.). Feature engineering components 1930 may use information in each matrix 1920 to create a feature vector 1940 for each of the three turbines (e.g., the feature vector 1940 for turbine C might include $FS_{C1}$, $FS_{C2}$, etc.). The three feature vectors 1940 may then be combined into a single global feature vector 1950 for the system 1900. Interaction features 1960 may be applied (e.g., associated with A*B*C, A+B+C, etc.) and an abnormality detection engine 1970 may compare the result with a decision boundary and output a global abnormality status signal when appropriate.

Figure 20:
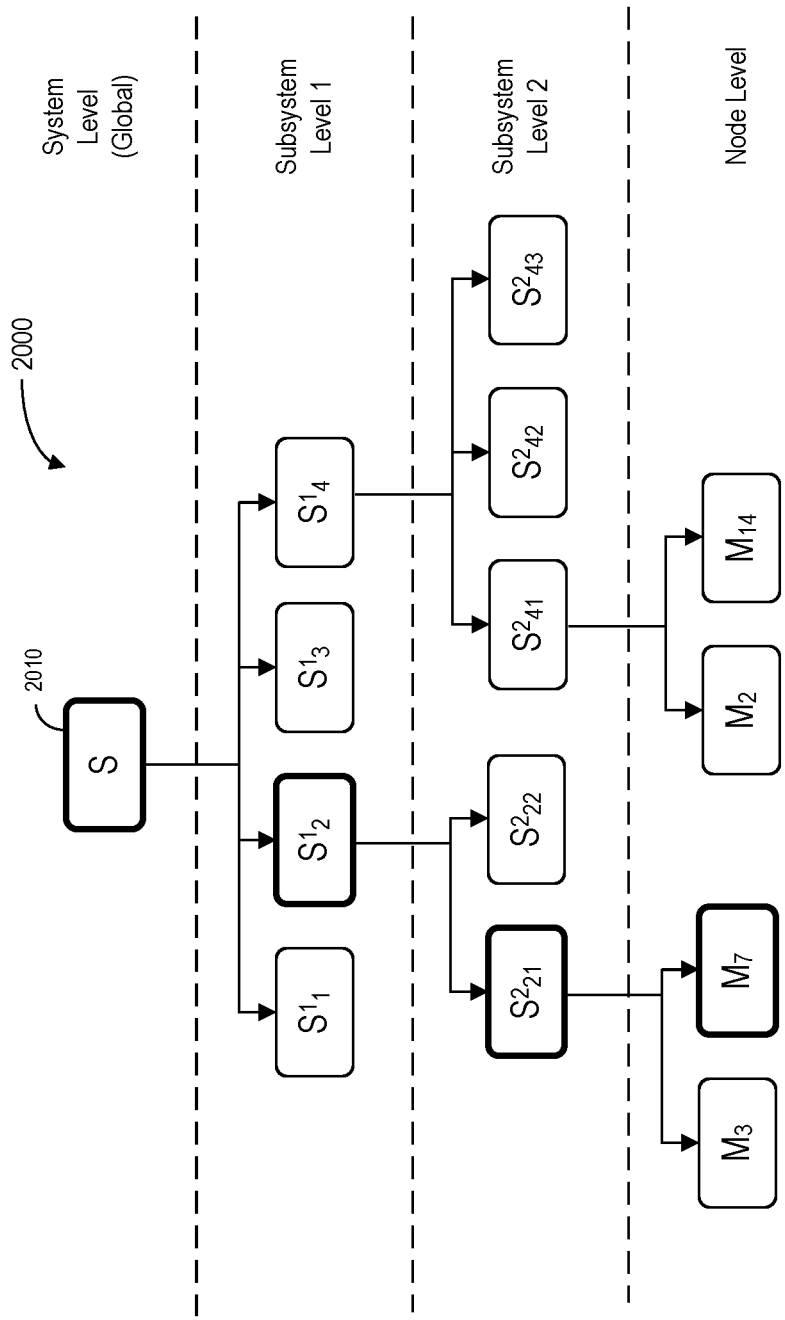
FIG. 20 is an example of a top-down hierarchical attack localization scheme according to some embodiments.

According to some embodiments, such a global status signal may be used as the "top" or highest level of a hierarchal abnormality localization structure. For example, FIG. 20 is an example 2000 of a top-down hierarchical attack localization scheme according to some embodiments. This approach uses a multi-level hierarchical structure 2010 containing elements in four levels: (1) the system (or global) level, (2) a first subsystem level, (3) a second subsystem level, and (4) a monitoring node level. The highest level contains a single element (S) representing the global status signal calculated as described with respect to FIG. 19.

The next level in the hierarchy includes four elements (subsystems $S^1_1$, $S^1_2$, $S^1_3$, and $S^1_4$). Subsystem $S^1_1$ is associated with subsystems $S^2_{21}$ and $S^2_{22}$ in the next level. Likewise, subsystem $S^1_3$ is associated with subsystems $S^2_{41}$, $S^2_{42}$, and $S^2_{43}$ in the next level. Finally, subsystem $S^2_{21}$ is associated with monitoring nodes $M_3$ and $M_7$ in the node level, and subsystem $S^2_{41}$ is associated with monitoring nodes $M_2$ and $M_{14}$. In the example 2000 of FIG. 20, elements with an "abnormal" status are illustrated with bold lines.

Initially, the system may evaluate the global status S, which is "abnormal." If S was "normal," it could have been assumed that all elements in the structure 2010 are "normal" (and the process would end). However, the global status S is "abnormal," and the system may therefore evaluate the four subsystems in the next lower level and determine that only $S^1_2$ is "abnormal" within that level. Because $S^1_4$ is determined to be "normal," the system does not need to evaluate any the elements below that particular subsystem in the structure 2010. Thus, the system may save time and computing resources by skipping the evaluation of $S^2_{41}$, $S^2_{42}$, and $S^2_{43}$. This process may be repeated for each level until the abnormality is localized to monitoring node $M_7$ at the node level.

Figure 21:
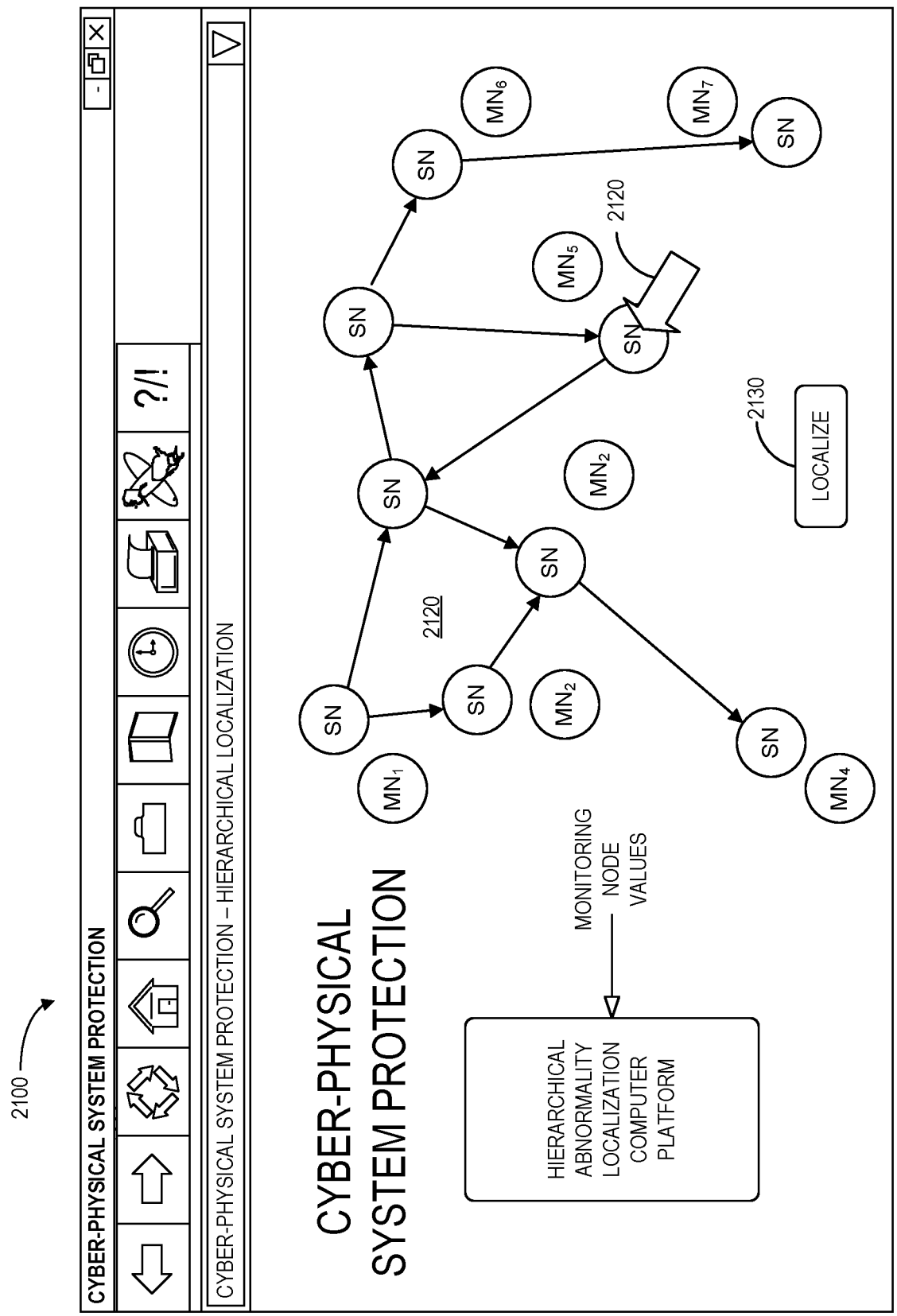
FIG. 21 is a cyber-physical system protection system display in accordance with some embodiments.

FIG. 21 is an example of a cyber-physical system protection display 2100 that might be used, for example, to provide a graphical depiction of a cyber-physical system 2110 (e.g., including system nodes, monitoring nodes, and node connections) to an operator and/or to provide an interactive interface allowing an administrator to adjust system components as appropriate. Selection of an element on the display 2100 (e.g., via a touchscreen or computer mouse pointer 2120) may let the operator see more information about that particular element (e.g., in a pop-up window) and/or adjust operation of that element (e.g., by altering or activating a hierarchical data structure). Selection of a "Localize" icon 2130 might cause the system to automatically determine where an abnormality originated.

Figure 22:
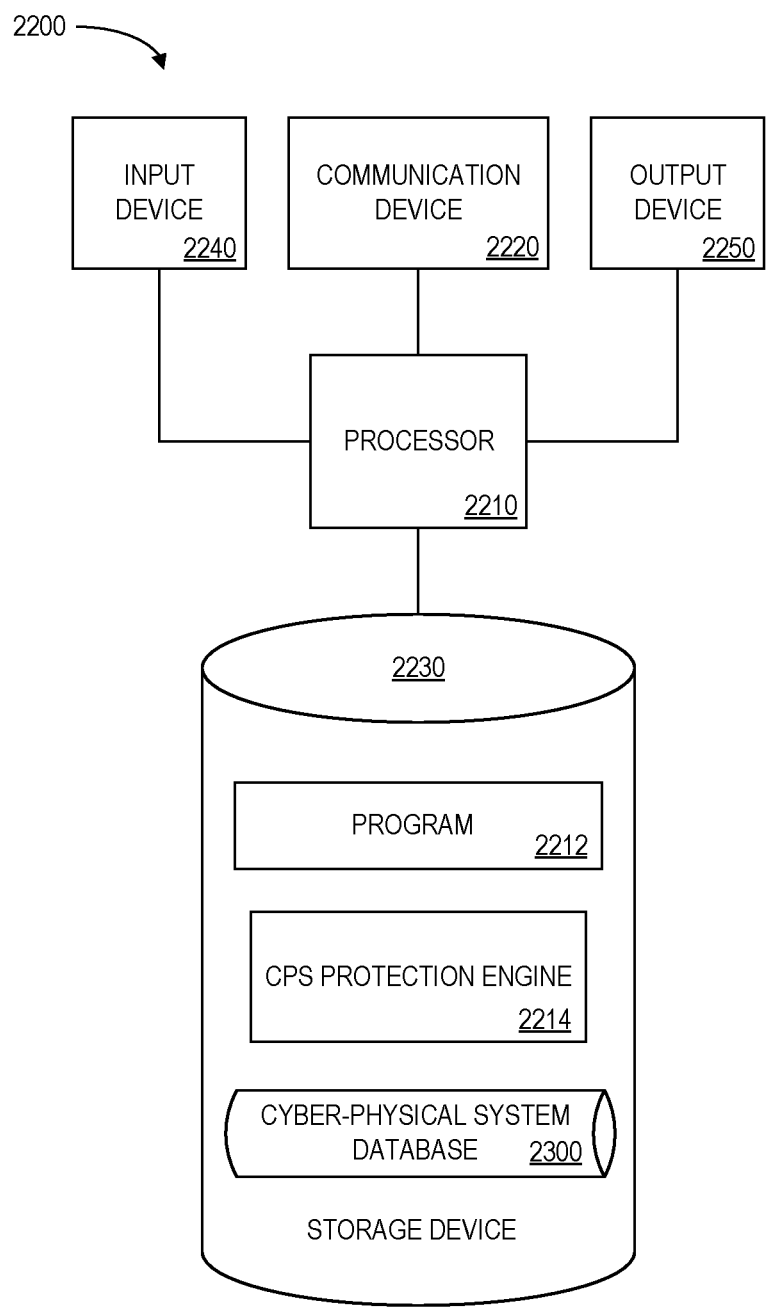
FIG. 22 is a cyber-physical system protection platform according to some embodiments.

Note that the embodiments described herein may be implemented using any number of different hardware configurations. For example, FIG. 22 is a block diagram of a cyber-physical system protection platform 2200 that may be, for example, associated with the systems 100, 800 of FIGS. 1 and 8, respectively, and/or any other system described herein. The cyber-physical system protection platform 2200 comprises a processor 2210, such as one or more commercially available Central Processing Units ("CPUs") in the form of one-chip microprocessors, coupled to a communication device 2220 configured to communicate via a communication network (not shown in FIG. 22). The communication device 2220 may be used to communicate, for example, with one or more remote monitoring nodes, user platforms, digital twins, etc. The cyber-physical system protection platform 2200 further includes an input device 2240 (e.g., a computer mouse and/or keyboard to input cyber-physical system parameters and/or modeling information) and/an output device 2250 (e.g., a computer monitor to render a display, provide alerts, transmit recommendations, and/or create reports). According to some embodiments, a mobile device, monitoring physical system, and/or PC may be used to exchange information with the cyber-physical system protection platform 2200.

The processor 2210 also communicates with a storage device 2230. The storage device 2230 may comprise any appropriate information storage device, including combinations of magnetic storage devices (e.g., a hard disk drive), optical storage devices, mobile telephones, and/or semiconductor memory devices. The storage device 2230 stores a program 2212 and/or cyber-physical system protection engine 2214 for controlling the processor 2210. The processor 2210 performs instructions of the programs 2212, 2214, and thereby operates in accordance with any of the embodiments described herein. For example, the processor 2210 may accesses a multi-level hierarchy of elements, and elements in a first level of the hierarchy may be associated with elements in at least one lower level of the hierarchy and at least some elements may be associated with monitoring nodes. The processor 2210 may then determine, based on feature vectors and a decision boundary, an abnormality status for a first element in the highest level of the hierarchy. If the abnormality status indicates an abnormality, the processor 2210 may determine an abnormality status for elements, associated with the first element, in at least one level of the hierarchy lower than the level of the first element. These determinations may be repeated by the processor 2210 until an abnormality is localized to a monitoring node.

The programs 2212, 2214 may be stored in a compressed, uncompiled and/or encrypted format. The programs 2212, 2214 may furthermore include other program elements, such as an operating system, clipboard application, a database management system, and/or device drivers used by the processor 2210 to interface with peripheral devices.

As used herein, information may be "received" by or "transmitted" to, for example: (i) the cyber-physical system protection platform 2200 from another device; or (ii) a software application or module within the cyber-physical system protection platform 2200 from another software application, module, or any other source.

In some embodiments (such as the one shown in FIG. 22), the storage device 2230 further stores a cyber-physical system database 2300. An example of a database that may be used in connection with the cyber-physical system protection platform 2200 will now be described in detail with respect to FIG. 23. Note that the database described herein is only one example, and additional and/or different information may be stored therein. Moreover, various databases might be split or combined in accordance with any of the embodiments described herein.

Figure 23:
FIG. 23 is portion of a tabular cyber-physical system database in accordance with some embodiments.

Referring to FIG. 23, a table is shown that represents the cyber-physical system database 2300 that may be stored at the cyber-physical system protection platform 2200 according to some embodiments. The table may include, for example, entries identifying cyber-physical systems to be protected and associated monitoring nodes. The table may also define fields 2302, 2304, 2306, 2308, 2310, 2312 for each of the entries. The fields 2302, 2304, 2306, 2308, 2310, 2312 may, according to some embodiments, specify: a cyber-physical system identifier 2302, a cyber-physical system description 2304, a multi-level hierarchy 2306, local feature vectors 2308, global feature vectors 2310, and a status 2312. The cyber-physical system database 2300 may be created and updated, for example, when a new physical system is monitored or modeled, an attack is detected, etc.

The cyber-physical system identifier 2302 and description 2304 may define a particular asset or system that will be protected along with a particular monitoring node associated with that system. The multi-level hierarchy 2306 might define or link to a structure that can be utilized when localizing abnormality determinations. The local feature vectors 2308 and global feature vectors 2310 may be based on features extracted from times series data for each monitoring node. The local watermarking feature vectors 2308 and global watermarking feature vectors 2310 may be generated based on random watermarking signals that were injected at certain points within the system. The status 2312 might indicate if a monitoring node is normal, attacked, fault, etc.

Thus, embodiments may provide technical improvements to cyber-physical system protection. For example, a system may enable algorithm coverage even for large-scale systems, such as a Heat Recover and Steam Generation ("HRSG") system (which may contain hundreds of nodes). Embodiments may provide flexibility with respect to the system architecture allowing localization to be performed to a desired level of granularity. Embodiments may also significantly reduce the computational cost of localization by making localizations decision hierarchical.

Embodiments may identify abnormalities in an accurate manner. For example, FIG. 24 is table 2400 providing subsystem results in connection with a HRSG device according to some embodiments. Note that in a combined cycle power plant, a HRSG unit may consist of hundreds of monitoring nodes. Even after hand-picking the more critical nodes using domain knowledge, more than one hundred nodes might still remain. In this example, using the knowledge-based approach, a subject HRSG system was partitioned into seven subsystems. The normal operation, simulated attack, and load sweep data were collected to train localization models. Then, seven separate HRSG subsystem classification models were trained, with the subsystems treated as nodes within the larger system. The significant subsystems of the subject HRSG were: High Pressure ("HP") Drum, Intermediate Pressure ("IP") Drum, Low Pressure ("LP") Drum, HP Steam Bypass, IP Steam Bypass, LP Steam Bypass, and Feedwater System. Results were compiled from combined steady-state and load sweep results using tenfold cross-validation and reported in the table 2400 of FIG. 24. With sensitivity set to a False-Positive Rate ("FPR") of 1%, True Positive Rates ("TPR") for most subsystems were 100% (with the exception of the IP Steam Bypass subsystem). FIG. 25 provides subsystem confusion matrices 500 in accordance with some embodiments.

Figure 26:
FIG. 26 is table providing generator subsystem results according to some embodiments.

FIG. 26 is table 2600 providing generator subsystem results according to some embodiments. In this example, a subject generator with 46 nodes across three subsystems was used to generate normal operation, load sweeps, and simulated attacks to train localization models. Similar to the global detection model created for the generator, three separate generator subsystem models were trained, with the subsystems treated as nodes within the larger system. Significant nodes were classified into one or multiple subsystems by a domain expert, with significant global features identified to replicate the global detection model for the generator. The fusion algorithm was applied to the outputs of the global detection model, as well as the three generator subsystem models to best simulate field operation and results. The significant subsystems of the subject generator were: Grid, Exciter/Breaker, and Frequency. Results were compiled from combined steady-state load sweep and attack results using tenfold cross-validation and reported in the table 2600 of FIG. 26. With sensitivity set to a FPR of 1%, TPRs for all subsystems were close to 100%.

That that specific tuning parameters may improve the accuracy of localization results for these subsystems. In particular, shorter and longer time windows for feature generation (12 time points for Grid, 75 time points for Frequency) improved results. Due to these window variances, the total cases within the confusion matrices may be different for differing subsystems. Similarly, increasing the number of hidden neurons in the ELM for Grid and Exciter/Breaker subsystems to 500 and 2000 neurons respectively improved sensitivity results. FIG. 27 provides the results 2700 per subsystem associated with tenfold cross-validation in accordance with some embodiments. In general, the localization algorithms correctly detected attacks and normal operation, including steady state and load sweeps.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Moreover, although some embodiments are focused on gas turbines, any of the embodiments described herein could be applied to other types of cyber-physical systems including power grids, dams, locomotives, additive printers, data centers, airplanes, and autonomous vehicles (including automobiles, trucks, drones, submarines, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to protect a cyber-physical system having a plurality of monitoring nodes each generating a series of current monitoring node values over time that represent current operation of the cyber-physical system, comprising:
a hierarchical abnormality localization computer platform having a memory and a computer processor adapted to:
access a multi-level hierarchy of elements, wherein at least some elements in a first level of the hierarchy are associated with a plurality of elements in at least one lower level of the hierarchy and at least some elements are associated with monitoring nodes,
determine, based on feature vectors and a decision boundary, the decision boundary indicating a distinction between normal operation and abnormal operation of at least a portion of the cyber-physical system within a multi-dimensional feature space, an abnormality status for a first element in the highest level of the hierarchy associated with a global feature vector,
if the abnormality status indicates an abnormality, determine an abnormality status for elements, associated with the first element, in at least one level of the hierarchy lower than the level of the first element, and
repeating said determinations until an abnormality is localized to at least one monitoring node.

2. The system of claim 1, wherein the hierarchical abnormality localization computer platform is further adapted to:
create the multi-level hierarchy of elements.

3. The system of claim 2, wherein said creating is performed by knowledge-based subsystem selection for the cyber-physical system.

4. The system of claim 2, wherein said creating is performed by automatic data-driven subsystem selection for the cyber-physical system.

5. The system of claim 4, wherein the automatic data-driven subsystem selection is associated with at least one of: (i) a data clustering method, (ii) a distance between node data and a cluster centroid, (iii) a Euclidian distance, (iv) a Mahalanobis distance, and (v) a correlation coefficient.

6. The system of claim 2, wherein said creating is performed by a hybrid process including both knowledge-based and automatic data-driven subsystem selection for the cyber-physical system.

7. The system of claim 1, wherein at least one decision boundary and abnormality status signal are associated with a local feature vector.

8. The system of claim 1, further comprising:
a normal space data source storing, for each of the plurality of monitoring nodes, a series of normal monitoring node values over time that represent normal operation of the cyber-physical system;
an abnormal space data source storing, for each of the plurality of monitoring nodes, a series of abnormal monitoring node values over time that represent abnormal operation of the cyber-physical system; and
an abnormality detection model creation computer platform having a memory and a computer processor adapted to:
receive the series normal monitoring node values and generate a set of normal feature vectors,
receive the series of abnormal monitoring node values and generate a set of abnormal feature vectors, and
automatically calculate and output an abnormality detection model including information about the at least one decision boundary based on the set of normal feature vectors and the set of abnormal feature vectors.

9. The system of claim 8, wherein the at least one decision boundary is associated with at least one of: (i) a linear boundary, (ii) a non-linear boundary, and (iii) a plurality of boundaries.

10. The system of claim 1, wherein the cyber-physical system is associated with at least one of: (i) an industrial control system, (ii) a heat recovery and steam generation unit, (iii) a turbine, (iv) a gas turbine, (v) a wind turbine, (vi) an engine, (vii) a jet engine, (viii) a locomotive engine, (ix) a refinery, (x) a power grid, (xi) a dam, (xii) an autonomous vehicle, and (xiii) a drone.

11. The system of claim 1, wherein at least one monitoring node is associated with at least one of: (i) a sensor node, (ii) a critical sensor node, (iii) an actuator node, (iv) a controller node, and (v) a key software node.

12. A method to protect a cyber-physical system having a plurality of monitoring nodes each generating a series of current monitoring node values over time that represent current operation of the cyber-physical system, the method comprising:
accessing, by a hierarchical abnormality localization computer platform, a multi-level hierarchy of elements, wherein at least some elements in a first level of the hierarchy are associated with a plurality of elements in at least one lower level of the hierarchy and at least some elements are associated with monitoring nodes;

determining, by the hierarchical abnormality localization computer platform based on feature vectors and a decision boundary, the decision boundary indicating a distinction between normal operation and abnormal operation of at least a portion of the cyber-physical system within a multi-dimensional feature space, an abnormality status for a first element in the highest level of the hierarchy associated with a global feature vector;

if the abnormality status indicates an abnormality, determining, by the hierarchical abnormality localization computer platform, an abnormality status for elements, associated with the first element, in at least one level of the hierarchy lower than the level of the first element; and repeating said determinations, by the hierarchical abnormality localization computer platform, until an abnormality is localized to at least one monitoring node.

13. The method of claim 12, further comprising:

creating, by the hierarchical abnormality localization computer platform, the multi-level hierarchy of elements.

14. The method of claim 13, wherein said creating is performed by knowledge-based subsystem selection for the cyber-physical system.

15. The method of claim 13, wherein said creating is performed by automatic data-driven subsystem selection for the cyber-physical system.

16. The method of claim 15, wherein the automatic data-driven subsystem selection is associated with at least one of: (i) a data clustering method, (ii) a distance between node data and a cluster centroid, (iii) a Euclidian distance, (iv) a Mahalanobis distance, and (v) a correlation coefficient.

17. The method of claim 13, wherein said creating is performed by a hybrid process including both knowledge-based and automatic data-driven subsystem selection for the cyber-physical system.

18. A non-transient, computer-readable medium storing instructions to be executed by a processor to perform a method to protect a cyber-physical system having a plurality of monitoring nodes each generating a series of current monitoring node values over time that represent current operation of the cyber-physical system, the method comprising:

accessing, by a hierarchical abnormality localization computer platform, a multi-level hierarchy of elements, wherein at least some elements in a first level of the hierarchy are associated with a plurality of elements in at least one lower level of the hierarchy and at least some elements are associated with monitoring nodes;

determining, by the hierarchical abnormality localization computer platform based on feature vectors and a decision boundary, the decision boundary indicating a distinction between normal operation and abnormal operation of at least a portion of the cyber-physical system within a multi-dimensional feature space, an abnormality status for a first element in the highest level of the hierarchy associated with a global feature vector, if the abnormality status indicates an abnormality, determining, by the hierarchical abnormality localization computer platform, an abnormality status for elements, associated with the first element, in at least one level of the hierarchy lower than the level of the first element, and repeating said determinations, by the hierarchical abnormality localization computer platform, until an abnormality is localized to at least one monitoring node.

19. The medium of claim 18, wherein the method further comprises:

creating, by the hierarchical abnormality localization computer platform, the multi-level hierarchy of elements, wherein said creating is performed by at least one of: (i) knowledge-based sub system selection for the cyber-physical system, automatic data-driven sub system selection for the cyber-physical system, and (iii) a hybrid process including both knowledge-based and automatic data-driven sub system selection for the cyber-physical system.

20. A system to protect a cyber-physical system having a plurality of monitoring nodes each generating a series of current monitoring node values over time that represent current operation of the cyber-physical system, comprising:

a hierarchical abnormality localization computer platform having a memory and a computer processor adapted to:

access a multi-level hierarchy of elements, wherein at least some elements in a first level of the hierarchy are associated with a plurality of elements in at least one lower level of the hierarchy and at least some elements are associated with monitoring nodes, determine, based on feature vectors and a decision boundary, the decision boundary indicating a distinction between normal operation and abnormal operation of at least a portion of the cyber-physical system within a multi-dimensional feature space, an abnormality status for a first element in the highest level of the hierarchy associated with a local feature vector, if the abnormality status indicates an abnormality, determine an abnormality status for elements, associated with the first element, in at least one level of the hierarchy lower than the level of the first element, and repeating said determinations until an abnormality is localized to at least one monitoring node.

21. The system of claim 20, wherein the hierarchical abnormality localization computer platform is further adapted to:

create the multi-level hierarchy of elements.

22. The system of claim 21, wherein said creating is performed by knowledge-based subsystem selection for the cyber-physical system.

23. The system of claim 21, wherein said creating is performed by automatic data-driven subsystem selection for the cyber-physical system.

24. The system of claim 23, wherein the automatic data-driven subsystem selection is associated with at least one of: (i) a data clustering method, (ii) a distance between node data and a cluster centroid, (iii) a Euclidian distance, (iv) a Mahalanobis distance, and (v) a correlation coefficient.

* * * * *